(12) United States Patent
Wingo et al.

(10) Patent No.: US 10,417,755 B1
(45) Date of Patent: Sep. 17, 2019

(54) DRONE-BASED INSPECTION OF WIRELESS COMMUNICATION TOWERS AND CORRESPONDING METHODS, SYSTEMS, AND APPARATUSES

(71) Applicant: Talon Aerolytics (Holding), Inc., West Point, GA (US)

(72) Inventors: Austin Wingo, Opelika, AL (US); Jeffrey Stackhouse, Opelika, AL (US); Michael Payne, Bloomingdale, GA (US); Phillip Bevel, Opelika, AL (US); John Santiago, Columbus, GA (US); Roland Beason, Auburn, AL (US); Ronnie Johnson, Cataula, GA (US); Timothy Dunnigan, Lanett, AL (US)

(73) Assignee: Talon Aerolytics (Holding), Inc., West Point, GA (US)

( * ) Notice: Subject to any disclaimer, the term of this patent is extended or adjusted under 35 U.S.C. 154(b) by 107 days.

(21) Appl. No.: 15/453,561

(22) Filed: Mar. 8, 2017

Related U.S. Application Data

(60) Provisional application No. 62/424,154, filed on Nov. 18, 2016.

(51) Int. Cl.
| | | |
|---|---|---|
| *G06T 7/00* | (2017.01) | |
| *H04W 24/02* | (2009.01) | |
| *B64C 39/02* | (2006.01) | |
| *H04W 24/04* | (2009.01) | |

(52) U.S. Cl.
CPC .......... *G06T 7/0004* (2013.01); *B64C 39/024* (2013.01); *H04W 24/02* (2013.01); *H04W 24/04* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 7,173,570 B1 | 2/2007 | Wensink et al. | |
| 9,371,133 B2 | 6/2016 | Mays | |
| 9,382,002 B1 | 7/2016 | Cavote | |
| 9,439,092 B1 | 9/2016 | Chukka et al. | |
| 2014/0031700 A1* | 1/2014 | Ferrantelli | A61B 5/1072 600/476 |
| 2016/0017866 A1 | 1/2016 | Craft et al. | |
| 2016/0033966 A1 | 2/2016 | Farris et al. | |
| 2016/0164874 A1 | 6/2016 | Lemmey et al. | |
| 2016/0191793 A1 | 6/2016 | Yang et al. | |
| 2016/0194079 A1 | 7/2016 | Montreuil | |

(Continued)

*Primary Examiner* — Samira Monshi
(74) *Attorney, Agent, or Firm* — Philip H. Burrus, IV

(57) ABSTRACT

A tower inspection system (100) includes an unmanned aircraft such as a drone (101). The drone includes one or more processors (105) operable with an image capture device (108) and a propulsion system (106). The propulsion system can navigate the unmanned aircraft about a wireless communication tower (300) along a flight path (321). The image capture device can capture one or more video images of identifying information (305) identifying the wireless communication tower disposed on an identification sign (304) prior to capturing other video images of one or more Radio Antenna Devices (RADs) (308,309,310,311) coupled to the wireless communication tower to make review of inspections faster and more efficient. Measurements of RADs can also be taken.

17 Claims, 15 Drawing Sheets

(56) References Cited

U.S. PATENT DOCUMENTS

2016/0309339 A1 10/2016 Priest et al.
2016/0309341 A1 10/2016 Priest et al.
2016/0309346 A1 10/2016 Priest et al.
2017/0024929 A1* 1/2017 Priest .................... H04W 24/02

* cited by examiner

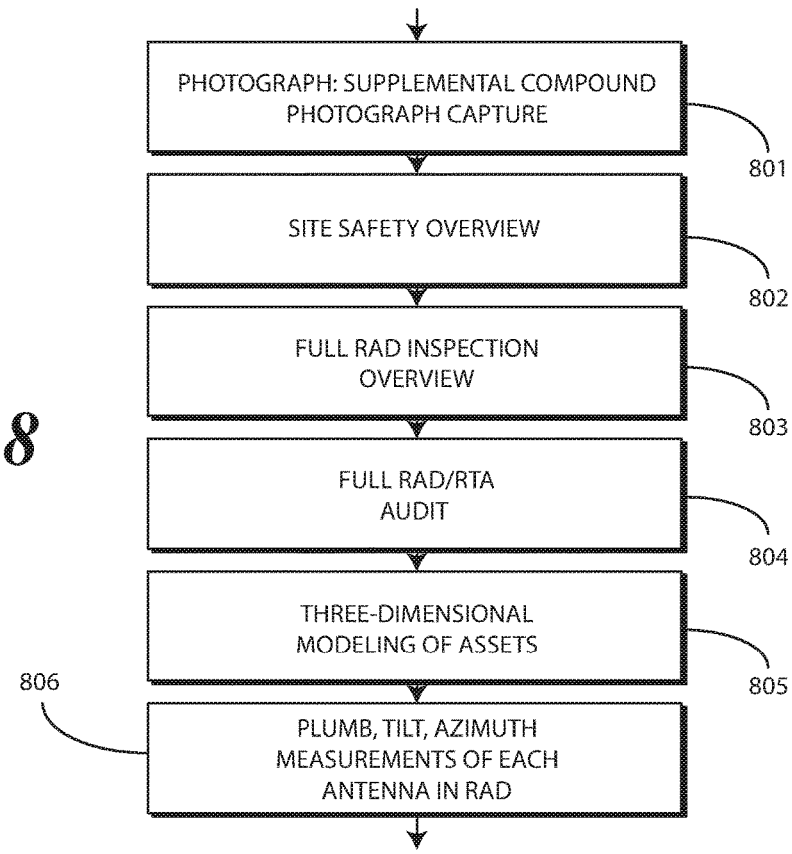

DRONE-BASED INSPECTION OF WIRELESS COMMUNICATION TOWERS AND CORRESPONDING METHODS, SYSTEMS, AND APPARATUSES

CROSS REFERENCE TO PRIOR APPLICATIONS

This application claims priority and benefit under 35 U.S.C. § 119(e) from U.S. Provisional Application No. 62/424,154, filed Nov. 18, 2016, which is incorporated by reference for all purposes.

BACKGROUND

Technical Field

This disclosure relates generally to wireless communication towers, and more particularly to systems, methods, and apparatuses for inspection of wireless communication towers.

Background Art

The use of wireless communication devices has become ubiquitous across the globe. Not too long ago, telephone calls had to be made through a telephone that was hardwired across a copper-wire network to another telephone. However, with the advent of wireless communication devices such as smartphones, a user need not be tethered to a hard-wired network to make calls. Instead, wireless communication devices send wireless signals to a network of terrestrial wireless communication towers. These signals are then relayed from tower to tower to facilitate voice, data, and multimedia communications between two wireless devices. These terrestrial networks of towers, frequently called "cellular networks," are vast and expansive. Literally hundreds of thousands of towers are operational in various networks across the United States alone.

System purveyors must work tirelessly to keep these terrestrial tower networks operational. If one or more antennas coupled to a single tower stop working, groups of neighborhoods, towns, or even small cities may find themselves without cellular network coverage. To ensure that each antenna on each tower remains operational, workers and technicians must constantly climb each tower and manually inspect each antenna.

Climbing towers is not only time consuming, but also dangerous. The United States Occupational Safety and Health Administration considers tower climbing to be one or the more dangerous vocations with which one can be involved. It is not uncommon for a tower worker to fall from the tower. Moreover, many towers are located in geographic locations not suitable for the construction of anything else, e.g., low, wetlands, mountainous hillsides, atop or alongside skyscrapers, and so forth. These conditions can exacerbate the dangers of the occupation. Even where the tower climb is successful with the climber avoiding injury, sending a technician up a tower can result in service outages while inspections occur. It would be advantageous to have an improved method of inspecting wireless communication towers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 8 illustrates one or more method steps in accordance with one or more embodiments of the disclosure.

FIG. 9 illustrates one or more method steps in accordance with one or more embodiments of the disclosure.

Figure 1:
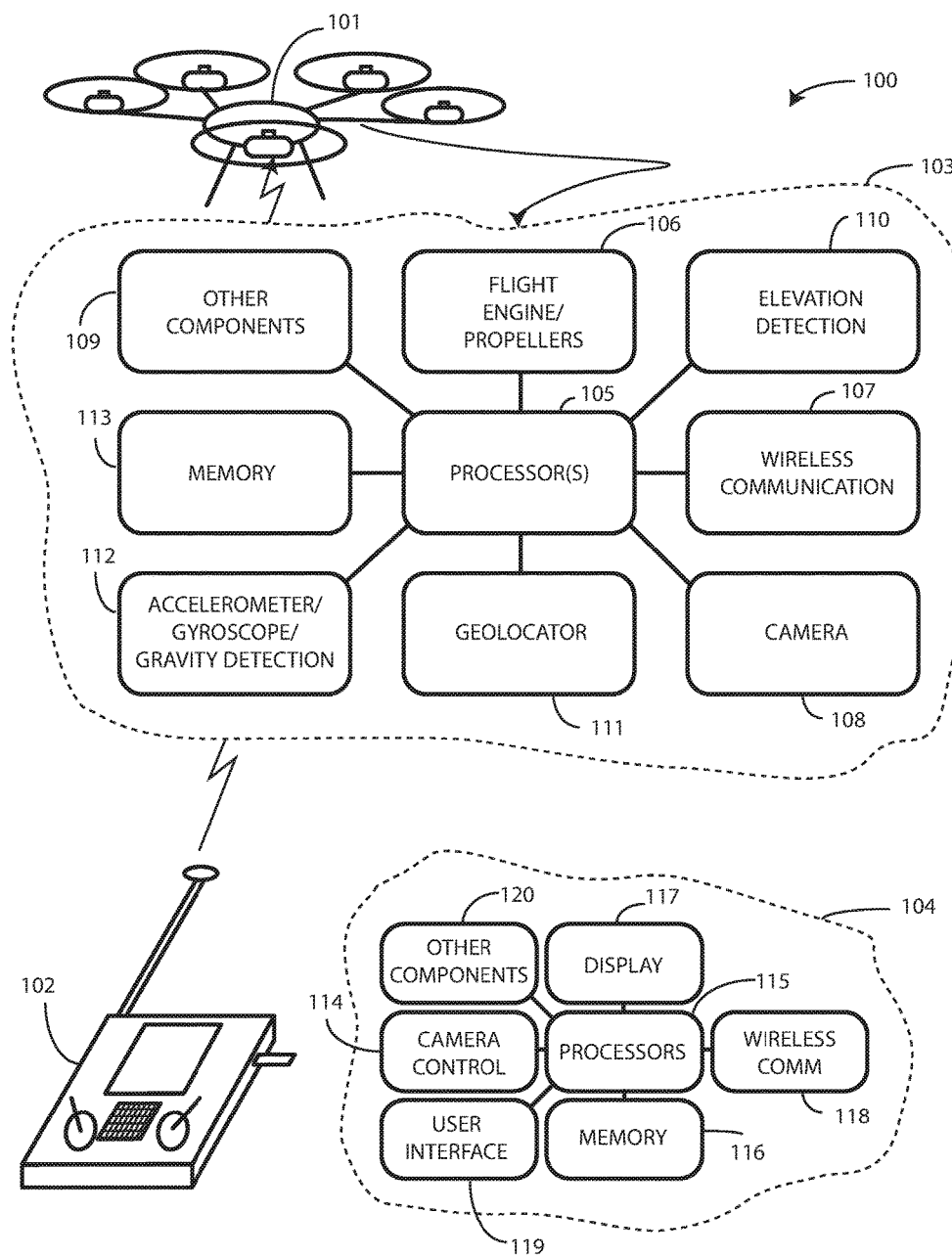
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using unmanned aircraft to perform wireless communication tower inspection. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to unmanned aircraft devices, improve the inspection process of wireless communication towers, in addition to reducing the chance that a tower climber will suffer an injury or death. Embodiments of the disclosure overcome problems specifically arising in the realm of wireless communication device technology and its associated physical infrastructure.

It will be appreciated that embodiments of the disclosure described herein may be comprised of one or more conventional processors and unique stored program instructions that control the one or more processors to implement, in conjunction with certain non-processor circuits, some, most, or all of the functions of unmanned aircraft control to inspect wireless communication towers as described herein. The non-processor circuits may include, but are not limited to, a radio receiver, a radio transmitter, image capture devices, aerial propulsion devices, signal drivers, clock circuits, power source circuits, and user control devices. As such, these functions may be interpreted as steps of a method to perform tower inspection using unmanned aircraft. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the present disclosure provide methods, systems, and apparatuses that allow unmanned aircraft, referred to herein as "drones" or "unmanned aerial vehicles," to inspect wireless communication towers in a controlled, consistent, and advantageous manner. Such unmanned aircraft comprise vehicles capable of flight and navigation without an onboard, human pilot. General unmanned aircraft, as well as their methods of control by remote pilots or one or more onboard processors, will be obvious to those of ordinary skill in the art having the benefit of this disclosure. Moreover, the selection of commercially available unmanned aircraft and/or design of custom unmanned aircraft suitable for executing the methods described below will be obvious to those of ordinary skill in the art having the benefit of this disclosure.

Embodiments of the disclosure advantageously eliminate the need for workers and technicians to climb a tower to perform physical inspections, thereby reducing or eliminating the chance of injury or death. Additionally, embodiments of the disclosure provide tower inspection techniques that are lower in cost than having a climber physically climb a tower. Moreover, embodiments of the disclosure offer inspection and measurement techniques, e.g., image capture of an outward facing antenna or making tilt and azimuth measurements that are difficult or impossible for a climber to perform due to the placement of antennas along the various trusses extending from the tower to which the climber is tethered.

In one or more embodiments, a drone or unmanned aerial vehicle inspects a tower in a predefined manner, collecting data associated not only with the tower itself, but with the physical compound upon which the tower is physically disposed. In some embodiments, in addition to inspecting wireless communication components, i.e., Radio Antenna Devices (RADs), the drone or unmanned aerial vehicle can inspect other Random Tower Assets (RTAs) such as safety cables, beacon lights, wires, connectors, climbing ladders, ground box and backup generator devices, fencing around the tower, and so forth. In one or more embodiments, the drone or unmanned aerial vehicle collects detailed information and measurements that can be analyzed and delivered to a customer through a web portal so that system purveyors can review up to date imagery and data of all of their assets with the click of a mouse.

Embodiments of the disclosure can advantageously inspect components that are difficult for a human climber to inspect. Illustrating by example, many RADs, connectors, and cables can be coupled to trusses extending distally from the tower itself and, accordingly, out of reach of the tower climber. Additionally, other components may be placed at the top or peak of a tower that are difficult for a tethered climber to reach. Advantageously, in one or more embodiments a drone or unmanned aerial vehicle can easily fly about such components to get high definition images and video so that the RADs and RTAs can be more closely and accurately inspected.

In one embodiment, a method of inspecting a wireless communication tower comprises deploying an unmanned aircraft outside a gate of a ground compound of the wireless communication tower. In one embodiment, the method includes capturing, with an image capture device of the unmanned aircraft, one or more of video or still images of information identifying the wireless communication tower disposed on an identification sign on the gate. In one embodiment, after the one or more video or still images of the information identifying the wireless communication tower have been captured, the image capture device can also capture, with the image capture device, additional one or more video or still images of one or more Radio Antenna Devices (RADs) coupled to the tower.

Turning now to FIG. 1, illustrated therein is one explanatory system 100 in accordance with one or more embodiments of the disclosure. In this illustrative embodiment, the system 100 includes a drone 101 and a control device 102. An illustrative schematic block diagram of each of the drone 101 and the control device 102 is also provided. In FIG. 1, schematic block diagram 103 corresponds to the drone 101, while schematic block diagram 104 corresponds to the control device 102.

It is to be understood that FIG. 1 is provided for illustrative purposes only and for illustrating components of one explanatory drone 101 and one explanatory control device 102 configured in accordance with one or more embodiments of the disclosure. Accordingly, schematic block diagram 103 and schematic block diagram 104 are not intended to be complete schematic diagrams of the various components required for either the drone 101 or the control device 102. Other drones or control devices configured in accordance with embodiments of the disclosure may include various other components not shown in FIG. 1, or may include a combination of two or more components or a division of a particular component into two or more separate components, and still be within the scope of the present disclosure.

In one or more embodiments, the drone 101 includes one or more processors 105. The one or more processors 105 are operable with the other components of the drone 101, e.g., the propulsion system 106 and any corresponding navigation system or guidance system, the wireless communication circuit 107, the on-board image capture device 108, the various sensors, or other components 109. Examples of sensors include an elevation detector 110, a geolocation detector 111, and one or more orientation sensors 112. Additional sensors can be included as well, such as laser, infrared, ultrasonic, or other types of measuring devices, internal measurement units, heat sensors, smoke detectors, barometers, and so forth. Batteries or other energy storage devices can also be included to power the various components shown in the schematic block diagram 103 as well.

The one or more processors 105 can include a microprocessor, a group of processing components, one or more ASICs, programmable logic, or other type of processing device. The one or more processors 105 can be configured to process and execute executable software code to perform the various functions of the drone 101. A storage device, such as memory 113, can optionally store the executable software code used by the one or more processors 105 during drone operation. The memory 113 may include either or both static and dynamic memory components, may be used for storing both embedded code and user data. The software code can embody program instructions and methods to operate the various functions of the drone 101, and also to execute software or firmware applications and modules. The one or more processors 105 can execute this software or firmware, and/or interact with modules, to provide drone functionality.

The one or more processors 105 can be operable with a wireless communication circuit 107 that communicates with the control device 102. The wireless communication circuit 107 may use any of a number of wireless technologies for communication, such as, but are not limited to, peer-to-peer or ad hoc communications, frequency modulated communication, amplitude modulated communication, or IEEE 802.11 communication. Other forms of wireless communication will be obvious to those having the benefit of this disclosure. The wireless communication circuit 107 can include wireless communication circuitry, one of a receiver, a transmitter, or transceiver, and one or more antennas.

The propulsion system 106 can include one or more rotary wings. In one embodiment, the propulsion system 106 comprises multiple rotary wings. For example, the propulsion system 106 can include four, six, or eight or more rotors configured as propellers. These propellers can be movable between a generally downward oriented direction to directions tilting forward, aft, and side-to-side so as to move the drone 101 up and down and side to side as desired. A user can employ the control device 102 to control the propulsion system to move the drone 101 as desired in one or more embodiments. In other embodiments, one or more firmware modules can be stored in the memory 113 so that the drone 101 can perform flight operations and can fly flight patterns autonomously. Of course, a combination of user driven control through the control device 102 and autonomous flight action can also be implemented.

In one or more embodiments, the propulsion system 106 can include an energy storage device that propels the rotary wings or propellers. Each propeller can be a two, three, four, or more bladed assembly. Increasing propeller blades decreases noise and increases thrust, while decreasing propeller blades increases efficiency. The exact number of blades or propellers can be selected based upon design, geographic location, typical wind and weather conditions, and so forth. A flight engine operable with the propellers can adjust and change the speeds of each motor driving each propeller to control the speed, direction, and motion of the drone 101.

An image capture device 108 can be configured to capture one or more still or video images in one or more embodiments. In one embodiment, the image capture device 108 can capture still or video images on a continual basis while the drone 101 is in operation. In another embodiments, the image capture device 108 can capture the still or video images automatically in response to sensed external stimuli, e.g., an object resembling the shape of a RAD coming into its line of sight. In yet another embodiment, the image capture device 108 can capture still or video images in response to an image capture control 114 user interface disposed on the control device 102.

In one or more embodiments, the image capture device 108 is further operable with the one or more processors 105 to determine and identify characteristics and geo-locational orientations of RADs and RTAs. For example, in one or more embodiments the image capture device 108 can determine azimuth, plumb, and tilt for each RAD in an array or arrays on a tower. This will be described in more detail below with reference to FIGS. 14-15. In other embodiments, the image capture device 108 can be operational with the geolocation detector 111 and/or the one or more orientation sensors 112 to determine a directional transmission/reception lobe associated with each RAD in an array or arrays on a tower.

In one or more embodiments, the one or more processors 105 are operable with the image capture device 108 to capture successive images of an environment. From these successive images, a three-dimensional model of any of a tower, RADs, RTAs, a compound disposed around the tower, equipment disposed within the compound, and the like may be created. For example, where the image capture device 108 comprises a stereo-vision camera, the one or more processors 105 can extract data from successive images to build three-dimensional models of these assets.

In one or more embodiments, the image capture device 108 can identify physical characteristics of RADs and RTAs. These physical characteristics can include rusting, physical damage, surface evenness of a RAD, or other characteristics. For example, in one or more embodiments the image capture device 108 can operate in conjunction with the one or more processors 105 as a damage detection device to determine whether signal cables are properly connected to each RAD. In one or more embodiments the image capture device 108 is configured with optical recognition such as include image recognition, surface recognition, color recognition, shape recognition, and the like. Advantageously, in one or more embodiments the image capture device 108 can distinguish between RADs and other RTAs. By recording this distinction in the memory 113 as metadata associated with the still and video images, subsequent analysis of tower assets becomes quicker and more efficient. Additionally, characteristics such as whether a RAD is rusty or covered with other debris that may hinder proper operation can be automatically determined.

As will be described in more detail below with reference to FIGS. 14-15, in one or more embodiments the image capture device 108 can operate in conjunction with the one or more processors 105 to determine geometric orientation, azimuth angle, tilt angle, plumb angle, and/or location of a RAD on an array. The one or more processors 105 can capture this information in metadata accompanying the still or video images to define alignment vectors for each RAD on an array. This additional information captured by the image capture device can be used to determine how each RAD is physically positioned on an array, as well as whether the physical orientation of the RAD in three-dimensional space has changed since the previous inspection.

The drone 101 can also include one or more orientation sensors 112, such as one or more accelerometers, gyroscopes, gravity detectors, or other devices that can determine the azimuth, plumb, and tilt of the drone 101 itself when in operation. For example, an accelerometer may be used to show vertical orientation, constant tilt and/or whether the drone 101 is stationary or in motion. A gyroscope can be used in a similar fashion. In addition to, or instead of, an accelerometer and/or gyroscope, an electronic compass can be included to detect the spatial orientation of the drone 101 relative to the earth's magnetic field.

The one or more orientation sensors 112 can be used to determine the spatial orientation of the drone 101 when in operation. In one embodiment, the one or more orientation sensors 112 make such determinations by detecting a gravitational direction. This can determine, for example, whether the image capture device 108 is oriented parallel with a reference line that is oriented substantially orthogonally with the vector defining the direction of gravity, above this reference line, or below this reference line.

A geolocation detector 111 can determine a latitude and longitude coordinate location for the drone 101. In one embodiment, geolocation detector 111 comprises a Global Positioning System (GPS) device that determines latitudinal and longitudinal coordinates from a constellation of one or more earth orbiting satellites or from a network of terrestrial base stations. Other systems can be used in place of the GPS system, such as the Global Orbiting Navigation System (GLONASS) or other satellite positioning systems. The geolocation detector 11 may also be able to determine location of the drone 101 by locating or triangulating terrestrial base stations of a traditional cellular network or from other local area networks.

An elevation detector 110, such as an altimeter, can be included to determine an altitude of the drone 101 while in operation. Other components 109 could be included as well. These other components 109 can include light sensors, magnetometers, laser measuring devices to determine the distance between the drone 101 and a RAD or RTA, an audio capture device to receive acoustic input, and so forth. The other components 109 can include input and output components, such as power inputs and outputs and/or mechanical inputs and outputs. Still other components will be obvious to those of ordinary skill in the art having the benefit of this disclosure. The explanatory drone 101 of FIG. 1 is illustrative only. Numerous other configurations will be obvious to those of ordinary skill in the art having the benefit of this disclosure.

The control device 102 is operable to allow an operator to control the flight of, and optionally the capture of data by, the drone 101. The control device 102 can include one or more processors 115 that are operable with a memory 116. The control device 102 can include a display 117, with which an operator can see still and video images as they are captured by the image capture device 108 of the drone 101. The control device 102 can send and receive electronic control signals to the drone 101 through a wireless communication circuit 118. The operator can control the drone 101 through a user interface 119, which can include one or more joysticks, knobs, slider controls, rocker controls, touch screens, touch pads, or other devices. Other components 120, such as audio capture devices and audio output devices, can be included as well.

In one or more embodiments, the operator views images captured by the image capture device 108 of the drone 101 on the display 117 to assist in navigating the drone 101 around a tower, around RADs, and around RTAs in accordance with embodiments of the disclosure. The display 117 allows the operator to visually see the environment, as well as any obstacles, power lines, mechanical support wires, and so forth, in real time. In one or more embodiments, the operator is instructed to never navigate the drone 101 under wires. The ability to visually see these wires on the display 117 assists in this directive. In other embodiments, the drone 101 is equipped with autonomous navigation that performs these operations, including never flying under wires, automatically. Where autonomous navigation is included, onboard instrumentation, e.g., the geolocation detector 111, image capture device 108, and/or orientation sensors 112, disposed within the drone 101 automatically recognizes as any obstacles, power lines, mechanical support wires, and so forth, so that they can be avoided.

In one or more embodiments, one or more predefined flight patterns can be stored in either the memory 116 of the control device 102 or the memory 113 of the drone 101. These predefined flight patterns can direct the drone 101 to execute a flight pattern through a predefined set of inspection points during a tower inspection. Examples of such predefined flight patterns will be described in more detail below with reference to FIGS. 2-7. Other predefined flight patterns will be obvious to those of ordinary skill in the art having the benefit of this disclosure.

In one or more embodiments, either the memory 116 of the control device 102 or the memory 113 of the drone 101 can store one or more inspection programs that are used to ensure that the drone 101 captures a predefined set of still and video images during a tower inspection. The one or more inspection programs can also include technical requirements for each still or video image to ensure that the same are properly captured. For example, when the drone 101 makes a 360-degree sweep about an array, in one embodiment a requirement may exist that this sweep last for a duration of between 90 and 140 seconds, with the assets of the array filling at least seventy percent of any still or video image, with a minimum International Standards Organization (ISO) exposure setting of 100. Similarly, a guide wire inspection may require a minimum of three still images of the guide wire, but may request less than a maximum of eight still images of the guide wire. Still other requirements will be described below with reference to subsequent figures. Still others will be obvious to those of ordinary skill in the art having the benefit of this disclosure.

Figure 2:
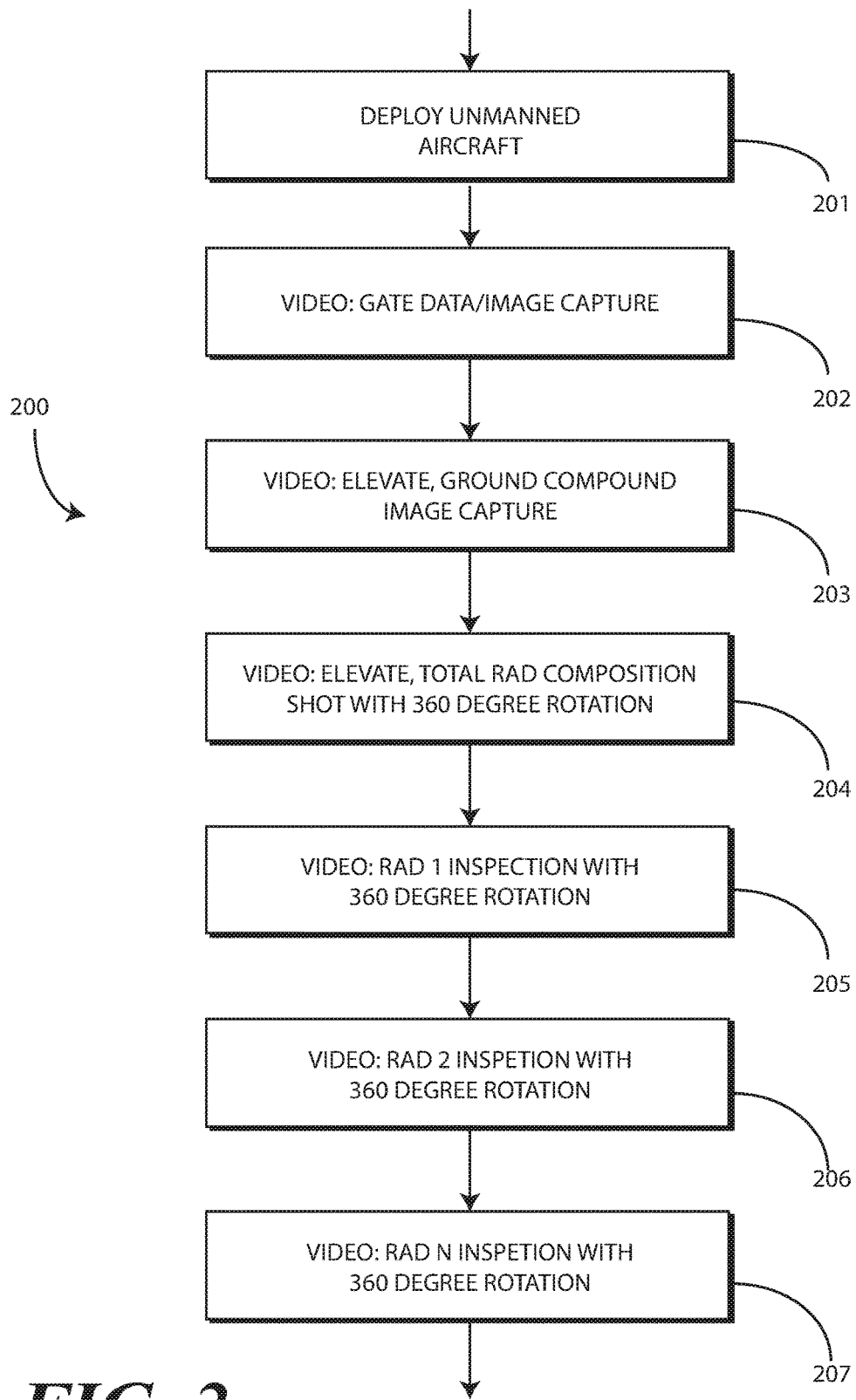
FIG. 2 illustrates one explanatory method in accordance with one or more embodiments of the disclosure.

Turning now to FIG. 2, illustrated therein is one explanatory method 200 for using the system (100) of FIG. 1. Embodiments of the disclosure provide predefined steps, such as starting from the gate of a compound disposed about a tower where a tower identifying sign can be seen, followed by perspective inspection of the compound, followed by an elevating inspection of the tower, followed by 360-degree inspections of all tower assets, followed by 360-degree inspections of single arrays, and so forth, because experimental testing has demonstrated these predefined steps to increase the efficiency of subsequent review of inspection data captured by the drone (101). Illustrating by example, in one or more embodiments the drone (101) is required to start at the gate of a compound surrounding a tower so that the identifying information associated with the tower is the first thing that will be seen if a subsequent reviewer wishes to review the inspection. Thus, rather than having to fast forward or rewind through content to confirm exactly which tower is being inspected, embodiments of the disclosure advantageously put this information front and center at the beginning of the inspection data so that it can easily be found. Moreover, the subsequent steps are arranged in a predefined order that optimizes the efficiency of review of the inspection data when this data is catalogued in a web portal and distributed to individual clients of the system (100).

In one or more embodiments, the method 200 of FIG. 2 begins at step 201 with a deployment of a drone (101) at an inspection site. This deployment can include one or more pre-flight checks to ensure that the drone (101) has sufficient energy to perform the inspection and that the drone (101) is communicating properly with the control device (102).

In one or more embodiments, the deployment occurring at step 201 comprises placing the drone (101) on the ground outside the gate of the ground compound of the tower. As will be described in subsequent steps, the method 200 includes elevating the drone (101) to at least the tower height. By deploying the drone (101) at the gate in step 201, this allows the drone (101) to maintain a safe and consistent orbit radius around the tower in one or more embodiments.

The inspection program then begins at step 202. In one or more embodiments, step 202 comprises the capture of video and/or images at a gate of a compound disposed around a tower. Illustrating by example, in one embodiment step 202 comprises capturing, with the image capture device (108) of the drone (101), video images that begin at the gate of the compound so that identifying indicia of the tower is the first data captured in the inspection. In one or more embodiments, step 202 comprises elevating the drone (101) off of the ground in front of the gate and capturing video imagery of identifying information disposed on the identification sign of the gate for at least three to five seconds. In one embodiment, there is a requirement that the video captured between ground and sign be without cuts or edits so that a client of the system (100) is ensured that the inspection data corresponds to a particular tower.

At step 203, the drone (101) lifts above the gate and ascends. In one or more embodiments, step 203 begins when the image capture device (108) of the drone (101) is receiving video images where the identifying indicia of the identification sign are legible. In one or more embodiments, the ascent of step 203 begins with the image capture device (108) focused on the base station of the tower, and while capturing video of the tower itself. In one or more embodiments, the drone (101) at step 203 does this while keeping the tower in the center of the video captured by the image capture device (108). In one embodiment, this occurs without cuts or edits from the video capturing the identifying information disposed on the identification sign of the gate.

In one embodiment, the elevation occurring at step 203 pauses so that a perspective view of the ground compound can be captured in full frame. In one embodiment, the perspective view of the ground compound is captured in full frame, with at least seventy percent of the sensor of the image capture device (108) of the drone (101) filled by the ground compound perspective view, for a duration of between three and five seconds. In one or more embodiments, this video capture of the ground compound occurs without cuts or edits from the gate vide captured at step 202.

After the perspective view of the ground compound is captured, in one or more embodiments step 203 comprises continuing the elevation of the drone (101). In one or more embodiments, this continuing elevation occurs while keeping the tower in the center of the video captured by the image capture device (108). In one embodiment, this further occurs without cuts or edits from the video capturing the perspective view of the ground compound. In one or more embodiments, the elevation of the drone (101) continues until the drone is centered with the RAD arrays disposed atop the tower.

At step 204, when the elevation such that the centering of the drone (101) with the various tower assets terminates with the image capture device (108) centered between the various RADs of the tower, the orientation of the image capture device (108) of the drone (101) slews a point of view that is substantially orthogonal with the orientation of the vector defined by gravity. In one embodiment, the method 200 at step 204 includes causing the drone (101) to circle the tower in a clockwise motion while capturing video of all RADs coupled to arrays at the top of the tower. For example, step 204 can include setting a lateral standoff of the drone (101) to ensure that all of the RADS fill at least seventy percent of the image sensor of the image capture device (108) with the point of view not varying more than five degrees relative to an orthogonal with gravity.

Step 204 then includes initiating a counterclockwise, 360-degree rotation about the tower while capturing video imagery of the RADS. In one or more embodiments, this video capture of the RADs without cuts or edits from the tower video captured at step 203. In one embodiment, the speed of rotation of the drone (101) about the tower at step 204 is set to be a smooth and safe pace so that the drone (101) can achieves an orbit about the tower that lasts approximately one minute. This results in video imagery of the tower assets lasting between 90 and 140 seconds.

In one or more embodiments, step 204 comprises capturing images with at least a seventy percent composition, which means that the sensor of the image capture device (108) will be at least seventy percent covered by the RADS and assets of the towers. In one or more embodiments, step 204 precludes any RADs or RTAs from being clipped or cut off in any frame of the captured video. In one or more embodiments, step 204 comprises circling the tower with a twenty-five foot lateral standoff with the image capture device (108) set to between a three times and five times optical zoom. In one or more embodiments, step 204 occurs with an exposure setting of the image capture device (108) optimized to avoid missing details of RADs and RTAs by overexposure. In one or more embodiments, step 204 is only to be performed when atmospheric wind speeds are below fifteen miles per hour. In one or more embodiments, the rotation occurring about the tower at step 204 begins when the drone (101) is aligned with the north side of the tower at the alpha array. This ensures that the alpha array, the gamma array, and the beta array are captured sequentially in one or more embodiments.

Once the rotation about the tower capturing vide images of all RADs terminates, steps 205,206,207 repeat the process for each array. For example, if a tower had three arrays, such as a first array belonging to carrier X, a second array belonging to carrier Y, and a third array belonging to carrier Z, step 205 would perform an inspection of the first array, step 206 would perform the inspection of the second array, step 207 would perform the inspection of the third array, and so forth. Where there were only two arrays, step 206 could be omitted.

In one or more embodiments, steps 205,206,207 comprise capturing video images similar to those captured in step 204. However, rather than having all RADs captured in the imagery, only a single array is captured in the imagery. Nonetheless, in one or more embodiments the composition remains at least at seventy percent, with no RADs of the array being clipped or cut off in any frame of the video images. In one or more embodiments, these steps 205,206, 207 will comprise establishing a twenty-five foot lateral standoff from the array being inspected, with the image capture device (108) set to between a three and five times optical zoom setting. The standoff and zoom settings can be adjusted to ensure that the minimum seventy percent composition is maintained in some embodiments. However, in one or more embodiments the lateral standoff is required to be at least twenty-five feet for safety of flight. The goal of steps 205,206,207 is to maximize visibility of the RADs in the captured video without clipping or trimming portions thereof by the frame. As with step 204, the exposure settings should avoid the elimination of RAD details by overexposure.

In one or more embodiments, each of steps 205,206,207 comprises initiating the rotation about the arrays at the north side of the tower at the alpha array. The 360-degree orbits should extend about one minute in duration, which results in video imagery being captured for between 55 and 80 seconds. In one embodiment, steps 205,206,207 occur without cuts or edits from the video capturing occurring at step 204. The orientation of the image capture device (108) of the drone (101) slews a point of view that is substantially orthogonal with the orientation of the vector defined by gravity. Steps 205,206,207 cause the drone (101) to circle the tower in a clockwise motion while capturing video of each RAD array. In one embodiment, the speed of rotation of the drone (101) about the tower at steps 205,206,207 is set to be a smooth and safe pace so that the drone (101) can achieves an orbit about the tower that lasts approximately one minute. This results in video imagery of the tower assets lasting between 50 and 80 seconds. In one or more embodiments, steps 205,206,207 are only to be performed when atmospheric wind speeds are below fifteen miles per hour.

In one or more embodiments, the steps of the method 200 occur autonomously. For example, instructions stored in the memory (113) of the drone (101) can cause the drone (101) to execute each step, thereby locating and passing through each inspection point. In one or more embodiments, quality controls can also be stored in the memory (113) of the drone (101) to ensure that the video quality captured meets one or more predefined requirements. Examples of these requirements include predefined durations, e.g., between 55 and 80 seconds, counterclockwise rotations about the tower, minimum composition fills, e.g., seventy percent, minimum camera settings, e.g., ISO-100 minimum exposure, environmental conditions, e.g., the environmental wind speed should be below fifteen miles per hour, and so forth. These quality controls are illustrated as steps of a method 900 in FIG. 1. Other quality controls will be obvious to those of ordinary skill in the art having the benefit of this disclosure.

In one or more embodiments, the control device (102) can present the operator of the drone (101) with a menu of options, with each option corresponding to a different method step. Where the drone (101) is manually operated by an operator instead of being operated autonomously, the operator can navigate the drone (101) through the various steps of the method 200 of FIG. 2 using the user interface (119) of the control device (102).

Figure 3:
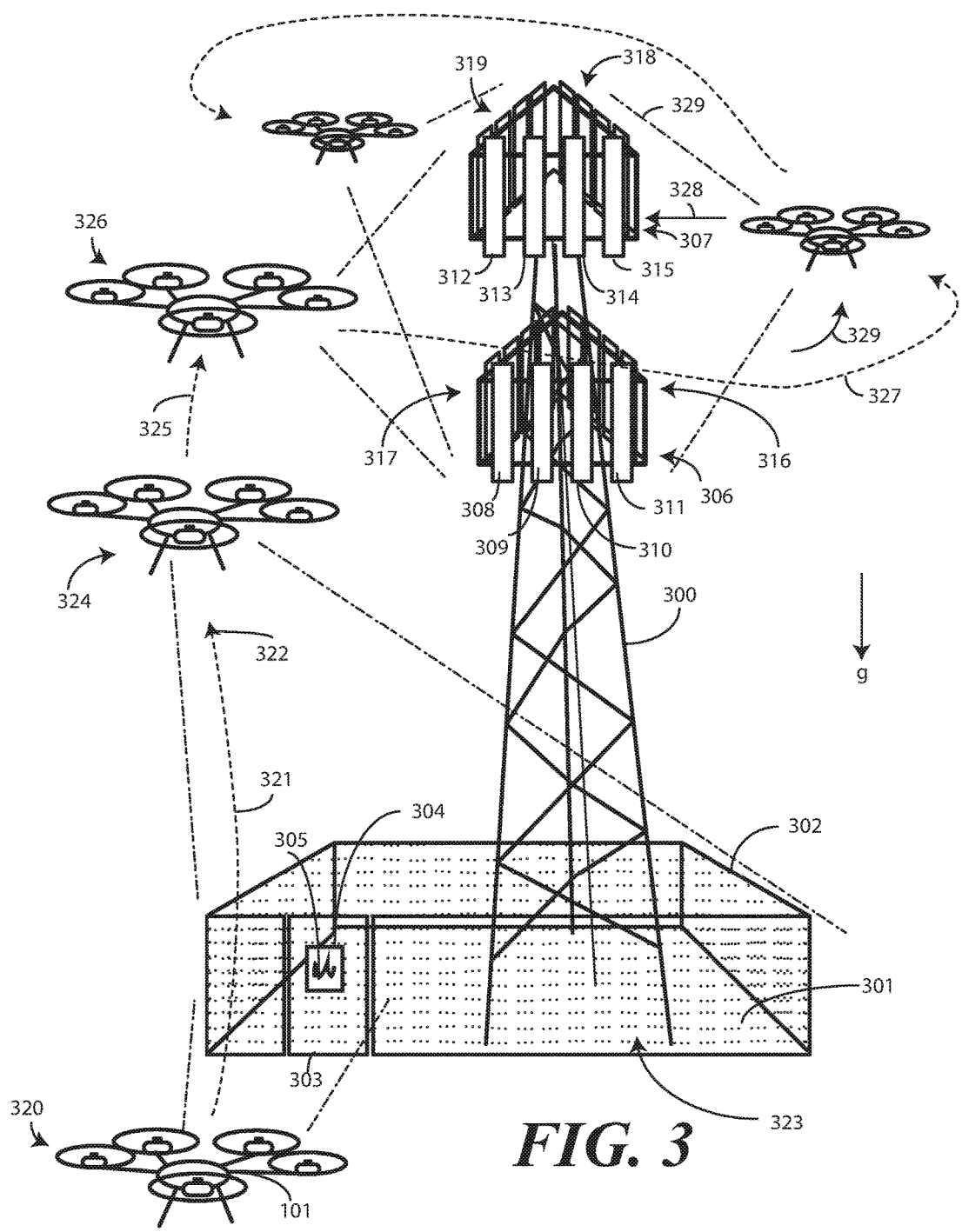
FIG. 3 illustrates one or more method steps in accordance with one or more embodiments of the disclosure.

Turning now to FIG. 3, illustrated therein is the drone 101 of FIG. 1 executing the steps of the method (200) of FIG. 2. As shown in FIG. 3, a tower 300 is disposed at a ground compound 301. The ground compound 301 is enclosed by a fence 302 in this illustrative embodiment. The fence 302 includes a gate 303 having an identification sign 304 comprising identifying indicia 305 of the tower disposed thereon.

In one embodiment, the tower 300 comprises a wireless communication tower such as that used in a conventional cellular communication network. The illustrative tower 300 of FIG. 3 includes two arrays 306,307 having one or more RADs disposed thereon. For example, RADs 308,309,310, 311 are disposed on array 306, while RADs 312,313,314, 315 are disposed on array 307. RADs 308,309,310,311 are disposed on the north side of array 306, which defines the alpha array. Similarly, RADs 312,313,314,315 are disposed on the alpha array of array 307. The gamma array 316 of array 306 is to the right of RADs 308,309,310,311, while the beta array 317 is to the left. Similarly, the gamma array 318 of array 307 is to the right of RADs 312,313,314,315, while the beta array 319 is to the left.

In one or more embodiments, each RAD 308,309,310, 311,312,313,314,315 can be coupled to various communications lines or switching lines. These communication lines and switching lines can couple the RADs 308,309,310,311, 312,313,314,315 to a switching center that facilitates the switching of various wireless communication signals between the RADs 308,309,310,311,312,313,314,315.

In one or more embodiments, the drone 101 is initially deployed at location 320. This allows the drone 101 to start capturing video images at the gate 303 of the ground compound 301 disposed about the tower 300 so that the identification sign 304 can be captured prior to subsequent steps such as capturing video images of a perspective inspection of the ground compound 301, an elevating inspection of the tower 300, 360-degree inspections of all tower assets, e.g., array 306 and array 307, 360-degree inspections of single arrays, e.g., inspections of array 306 and array 307 one at a time. As noted above, experimental testing has demonstrated the deployment at location 320, followed by the predefined steps of the flight path 321, increase the efficiency of subsequent review of inspection data captured by the drone 101. Moreover, location 320 allows the drone 101 to capture identifying information associated with the tower 300 as the initial data. The flight path 321 then occurs in a predefined order that optimizes the efficiency of review of the inspection data when this data is catalogued in a web portal and distributed to individual clients of the system (100).

Once the drone 101 is deployed at location 320, i.e., on the ground outside the gate 303 of the ground compound 301 of the tower 300, the drone 101 captures video and/or images of the gate 303. In one embodiment, the drone 101 captures video images, such as that shown at step 401 of FIG. 4, that begin at the gate 303 of the ground compound 301 so that the identifying indicia 305 on the identification sign 304 of the tower 300 is the first data captured in the inspection. In one or more embodiments, the drone 101 then elevates 322 along flight path 321 while capturing video imagery of identifying information 305 disposed on the identification sign 304 of the gate 303 for at least three to five seconds. In one embodiment, there is a requirement that the video captured between ground and identification sign 304 be without cuts or edits so that a client of the system (100) is ensured that the inspection data corresponds to the tower 300.

Once this video capture is completed, the drone 101 continues to elevate 322 or ascend along the flight path 321 with the image capture device (108) focused on the base station 323 of the tower 300 while capturing video of the tower 300 itself. In one embodiment, this occurs without cuts or edits from the video capturing the identifying information 305 disposed on the identification sign 304 of the gate 303.

Figure 4:
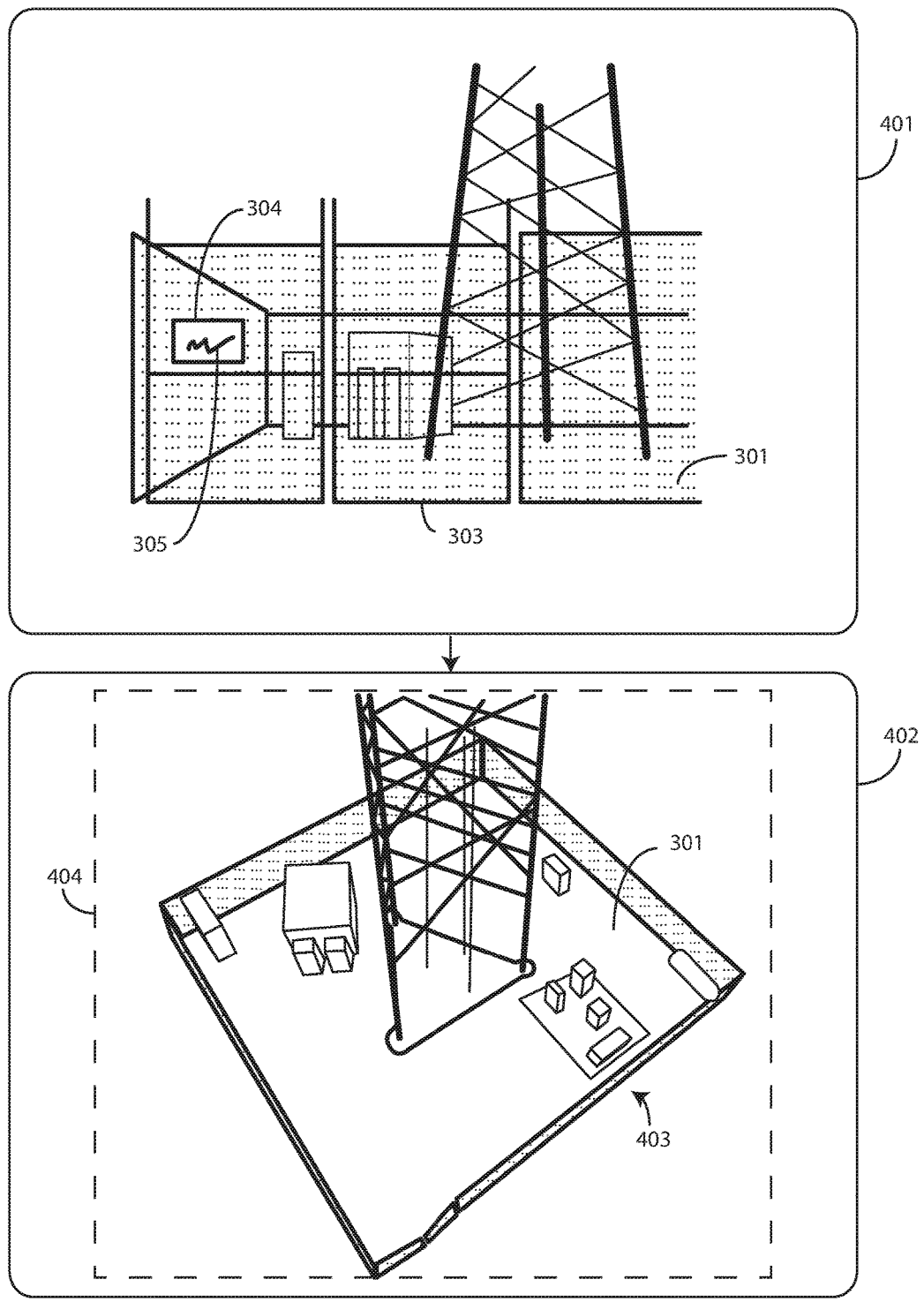
FIG. 4 illustrates one or more method steps in accordance with one or more embodiments of the disclosure.

In one embodiment, this elevation pauses with the drone 101 positioned at location 234 so that a perspective view of the ground compound 301 can be captured in full frame as shown at step 402 of FIG. 4. In one embodiment, the perspective view 403 of the ground compound 301 is captured in full frame, with at least seventy percent 404 of the frame filled by the perspective view 403 of the ground compound 301. In one embodiment, the drone 101 captures this perspective view 403 for a duration of between three and five seconds.

After the perspective view 403 of the ground compound 301 is captured, in one or more embodiments the drone 101 continues to elevate 325 to location 326 where it is centered with the alpha array of the tower assets, i.e., array 306, and array 307. Note that the drone 101 is shown to the left of the alpha arrays in FIG. 3 so that the RADs 308,309,310,311, 312,313,314,315 can be seen. However, in one or more embodiments location 326 is centered between the alpha array of array 306 and the alpha array of array 307. In one or more embodiments, this continuing elevation occurs while keeping the tower 300 in the center of the video captured by the image capture device (108) as shown at step 501 of FIG. 5. In one embodiment, the elevation 325 to location 326 occurs without cuts or edits from the video capturing the perspective view 403 of the ground compound 301 at step 402 of FIG. 4.

Figure 5:
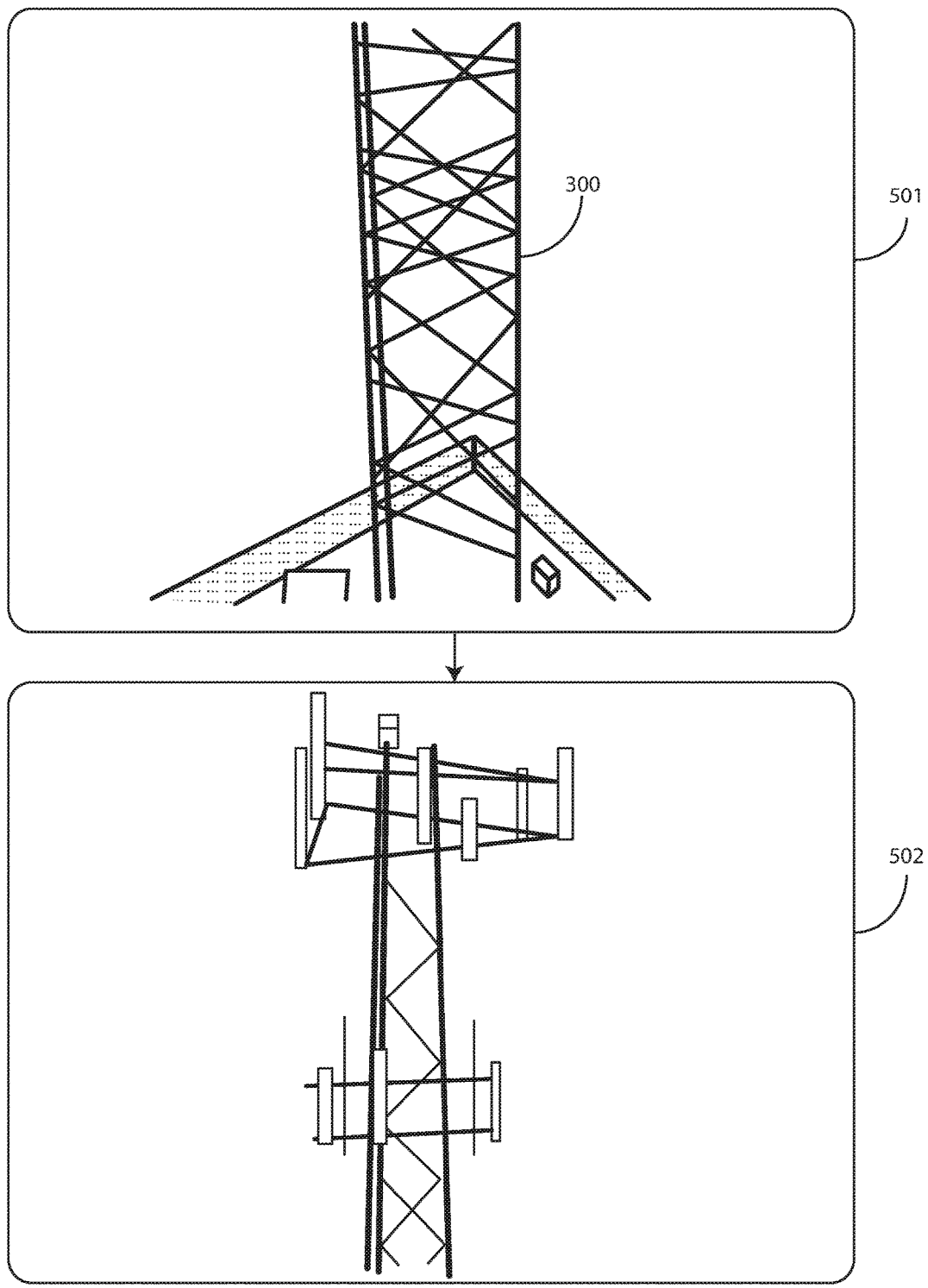
FIG. 5 illustrates one or more method steps in accordance with one or more embodiments of the disclosure.

From location 326, the drone 101 circles the tower 300 in a clockwise motion 329 while capturing video of all RADs 308,309,310,311,312,313,314,315 coupled to arrays 306, 307 at the top of the tower 300 as shown at step 502 of FIG. 5. As noted above, this rotation 327 can occur with a predefined minimum lateral standoff 328, such as twenty-five feet. In one embodiment, this rotation 327 occurs with a centerline of the point of view 330 not varying more than five degrees relative to an orthogonal vector defined by gravity. In one or more embodiments, this video capture of the RADs at step 502 without cuts or edits from step 501. In one embodiment, the speed of rotation 327 of the drone 101 about the tower 300 is at a smooth and safe pace so that the drone 101 can achieves an orbit about the tower 300 that lasts approximately one minute. This results in video imagery of the tower assets lasting between 90 and 140 seconds.

Figure 6:
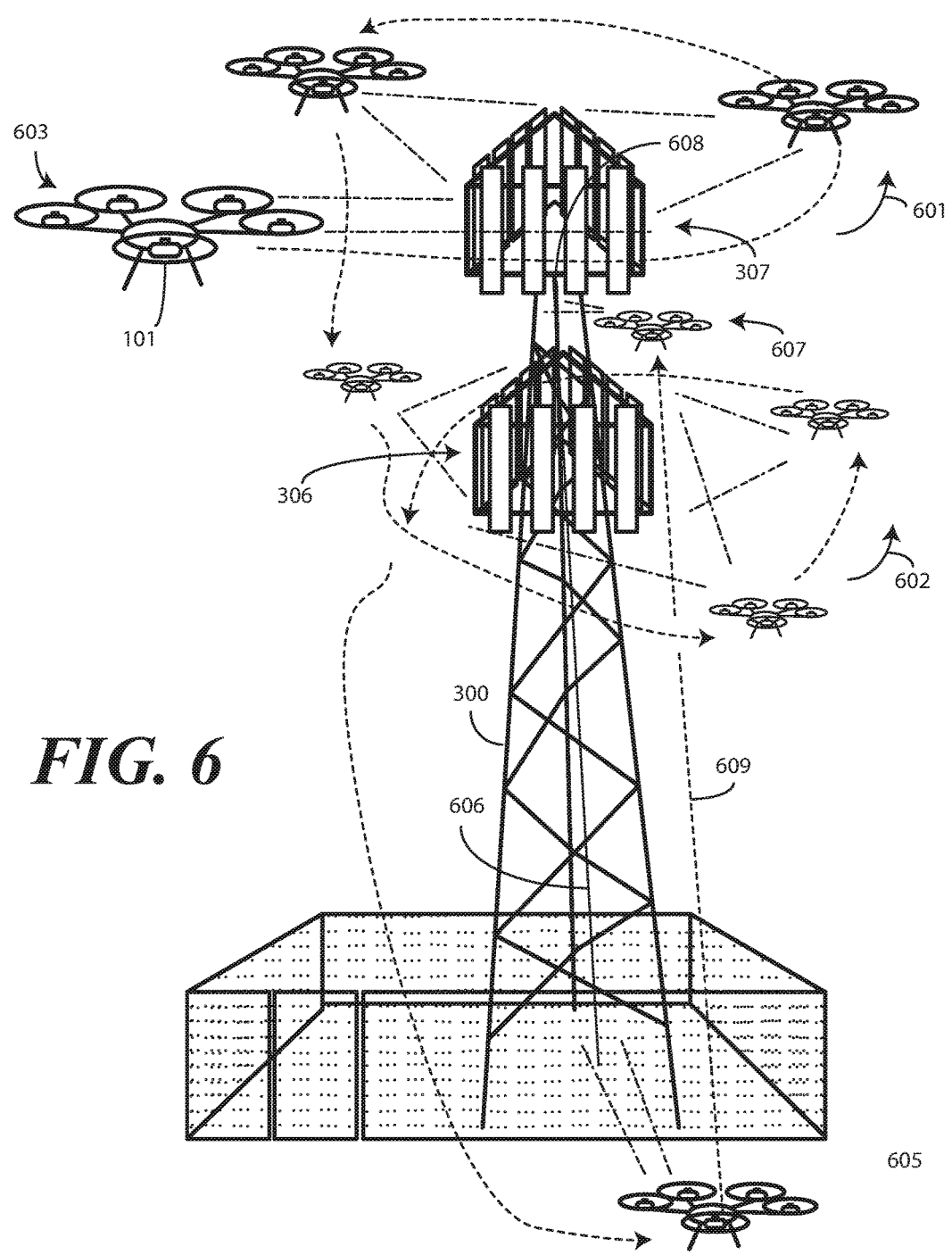
FIG. 6 illustrates one or more method steps in accordance with one or more embodiments of the disclosure.
Figure 7:
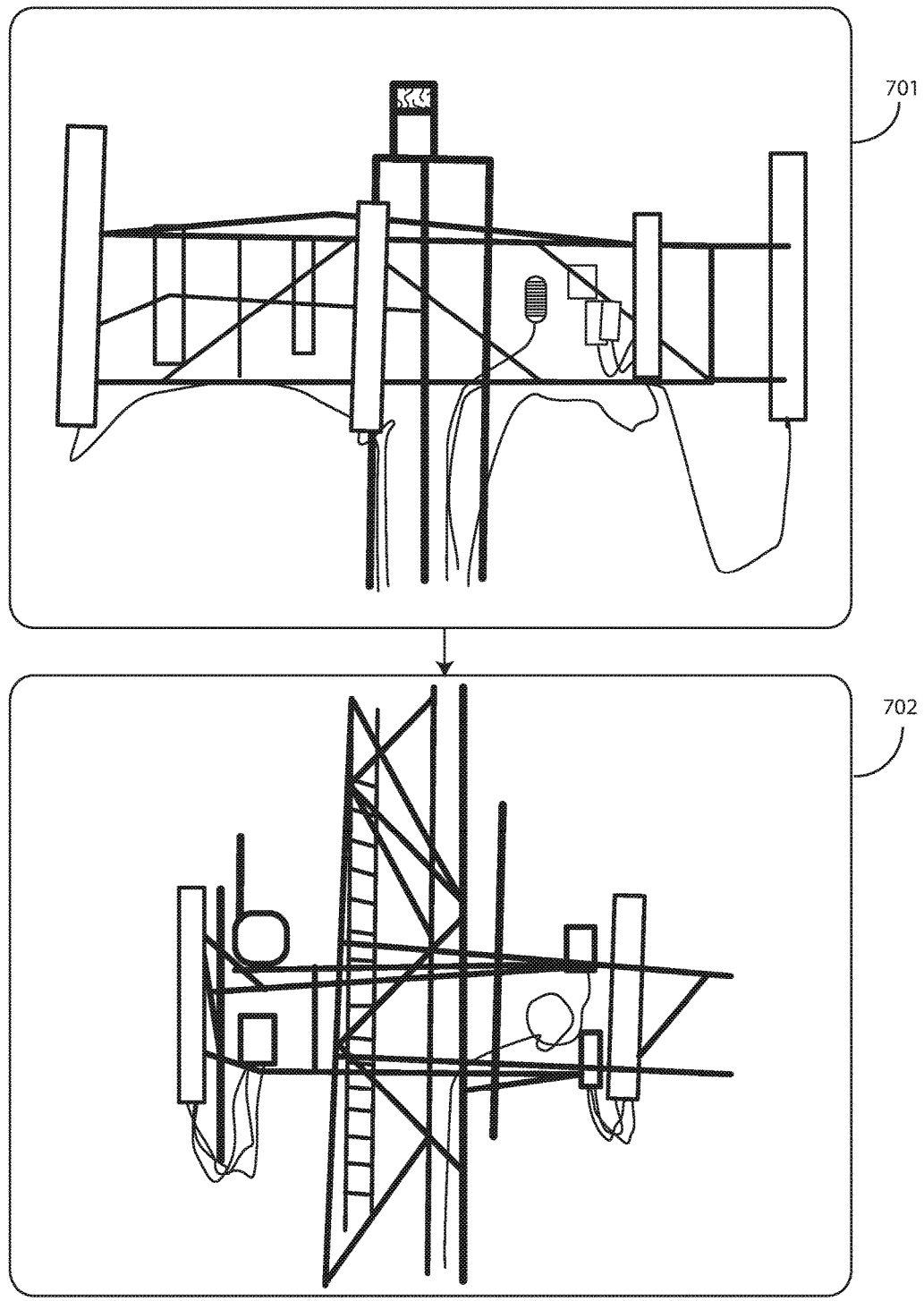
FIG. 7 illustrates one or more method steps in accordance with one or more embodiments of the disclosure.

Turning now to FIG. 6, once the rotation (327) about the tower 300 capturing video images of all RADs (308,309, 310,311,312,313,314,315) terminates, the drone 101 begins to inspect each array 306,307 individually. Rather than having all RADs captured in a rotation (327), only a single array is captured in each rotation 601,602. For example, rotation 601 captures the RADs of array 307, while rotation 602 captures the RADs of array 306.

As shown in FIG. 6, once rotation (327) is complete, in one embodiment the drone 101 initiates rotation 601 about array 307. In one or more embodiments, this rotation 601 begins from location 603, which is at the north side of the tower 300 aligned with the alpha array. In one embodiment, rotation 601 extends about one minute in duration, which results in video imagery being captured for between 55 and 80 seconds as shown at step 701 of FIG. 7. In one embodiment, rotation 601 occurs without cuts or edits from the video captured during rotation (327).

Once rotation 601 is complete, in one embodiment the drone 101 initiates rotation 602 about array 306. In one or more embodiments, this rotation 602 begins from location 604, which is at the north side of the tower 300 aligned with the alpha array of array 306. In one embodiment, rotation 602 extends about one minute in duration, which results in video imagery being captured for between 55 and 80 seconds as shown at step 702 of FIG. 7. In one embodiment, rotation 602 occurs without cuts or edits from the video captured during rotation 601.

Accordingly, in one or more embodiments completion of the steps of the method (200) of FIG. 2, as pictorially shown in FIGS. 3-7, results in a continuous video beginning at the identification sign (304) disposed on the gate (303) and then ending once the lowermost array, e.g., array 306 in this illustrative embodiment, of the tower 300 has been inspected. This allows for a tower owner, or carrier provider, to review the inspection data in a fluid, intuitive, and continuous manner to fully inspect the tower 300 without having to have a climber climb the tower.

Other steps in addition to the method (200) of FIG. 2 can be performed as well during the inspection of a tower. Turning now to FIG. 8, illustrated therein are some such steps. In one or more embodiments, each of the steps of FIG. 8 is optional. Moreover, the steps of FIG. 8 can be performed individually or in any combination. In some embodiments, all steps of FIG. 8 will be performed. In other embodiments, only some steps will be performed. Additional optional steps will be obvious to those of ordinary skill in the art having the benefit of this disclosure.

Figure 10:
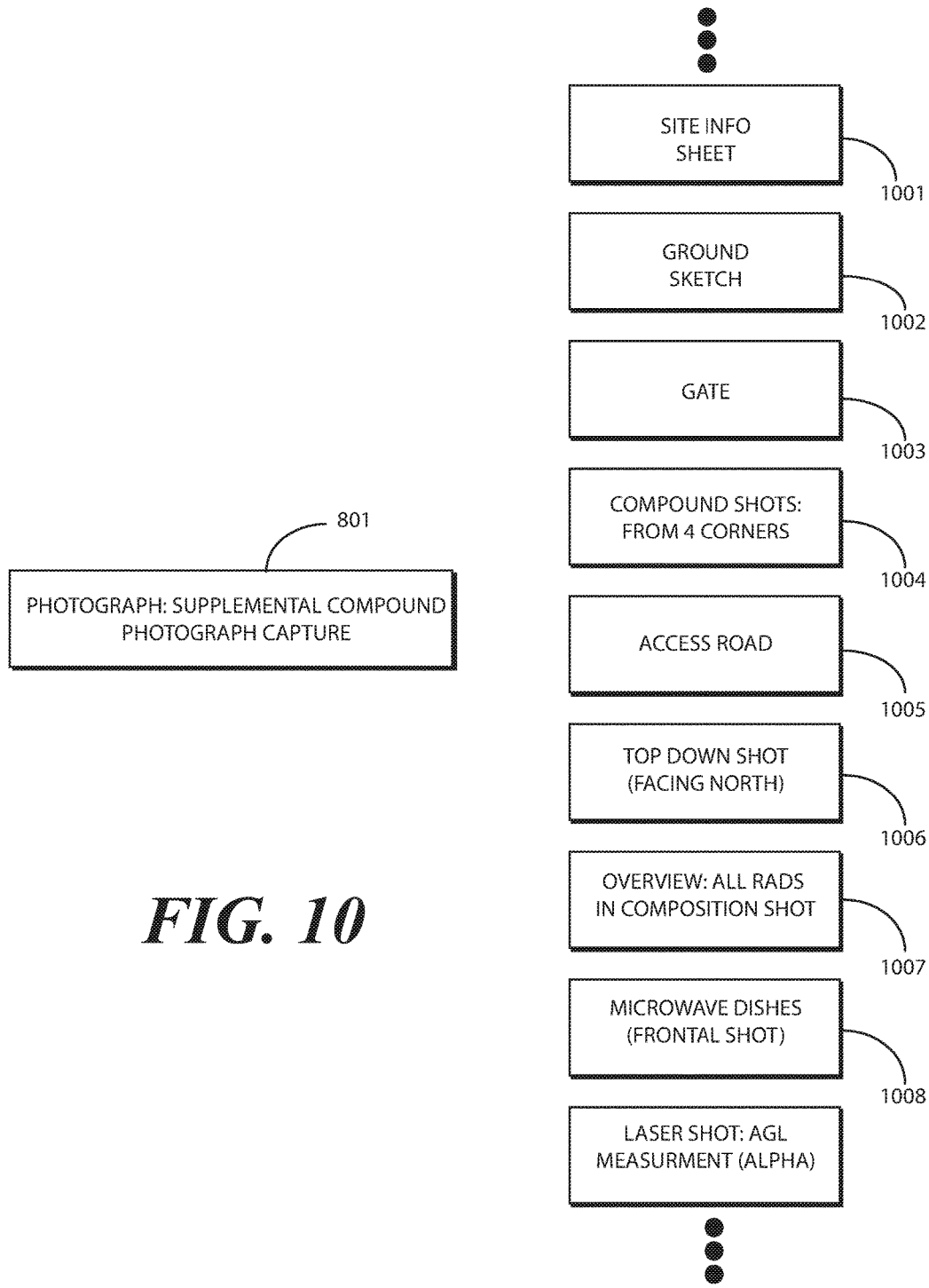
FIG. 10 illustrates one or more method steps in accordance with one or more embodiments of the disclosure.

Beginning with step 801, in one embodiment the drone can capture one or more supplemental pictures associated with the tower inspection. Turning now to FIG. 10, illustrated therein are examples of some of the supplemental pictures that can be taken during step 801.

In one embodiment, the supplemental pictures taken at step 801 include a picture 1001 of a site information sheet. In one or more embodiments, the site information sheet defines a work order for the operator performing the tower inspection. Alternatively, the site information sheet can provide instructions for the drone when the drone is acting autonomously. By capturing a picture 1001 of the site information sheet allows a reviewer of the inspection data to confirm that the site information sheet matches the identification indicia from the identification sign disposed along the gate of the fence of the ground compound of the tower.

In one embodiment, the supplemental pictures taken at step 801 include a photograph 1002 of a ground sketch of the ground compound. Each ground compound will have associated therewith a ground sketch indicating the location of the tower in the ground compound and the location of any ground equipment such as generators, switching boxes, cable routing boxes, and so forth. Accordingly, in one embodiment the supplemental pictures taken at step 801 include a photograph 1002 of this ground sketch so that a reviewer can further confirm that the tower being inspected corresponds to the data provided to the inspection team.

In one embodiment, the supplemental pictures taken at step 801 include a photograph 1003 of the gate of the ground compound. While video of the gate was captured during the method (200) of FIG. 2, embodiments of the disclosure contemplate that it can be advantageous to have a still photograph 1003 of the gate as well for easy review of the identification indicia from the identification sign disposed along the gate of the fence of the ground compound of the tower.

In one embodiment, the supplemental pictures taken at step 801 include multiple photographs 1004 of the ground compound. Illustrating by example, in one or more embodiments the multiple photographs 1004 of the ground compound comprise one still image captured from each of the four corners of the ground compound. In one or more embodiments, the multiple photographs 1004 of the ground compound comprise one still image captured from each corner of the fence of the ground compound, starting with the first corner to the right of the gate and concluding with the first corner to the left of the gate. This four-image example presumes a rectangular fence. Fences with other shapes will include additional still images captured from other corners of the fence.

In one embodiment, the supplemental pictures taken at step 801 include a still photograph 1005 of any access road leading to the ground compound. Embodiments of the disclosure contemplate that vegetation, fallen trees, tumbling boulders, and even large animals can sometimes block the access road, thereby impeding access to the tower and ground compound. Embodiments of the disclosure contemplate that it can be advantageous to have a still photograph 1005 of the access road so that a reviewer will know whether the access road is in good condition or whether a lumberjack, bulldozer, herding dog, or other remediation tool should be sent to address issues with the access road.

In one embodiment, the supplemental pictures taken at step 801 include a still photograph 1007 of the tower from directly above the tower. This is known as a "top down" shot. In one embodiment, the still photograph 1007 of the top down shot is taken with the drone facing north. The top down shot allows a reviewer to see, for example, whether any birds have built nests that may be hidden by the RADs or RTAs of the tower.

In one embodiment, the supplemental pictures taken at step 801 include a still photograph 1007 of all RADs in a single shot. In one embodiment, the supplemental pictures taken at step 801 include a still photograph 1008 of any microwave dishes attached to the tower. The supplemental pictures of FIG. 10 are illustrative only, as others will be obvious to those of ordinary skill in the art having the benefit of this disclosure.

Figure 11:
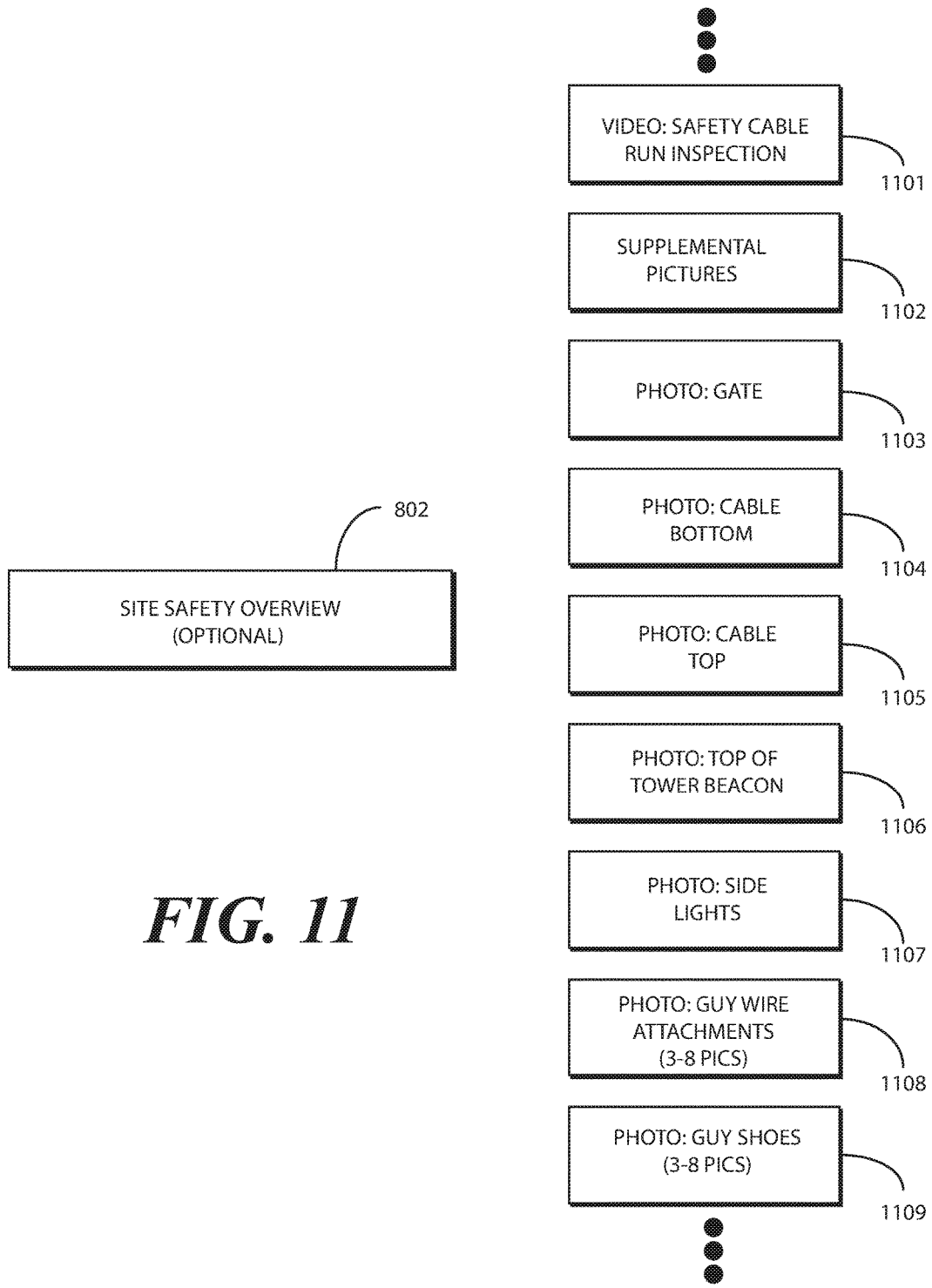
FIG. 11 illustrates one or more method steps in accordance with one or more embodiments of the disclosure.

Turning now back to FIG. 8, at step 802 the additional steps can include the performance of a site safety inspection. Turning now to FIG. 11, illustrative steps for inclusion with the site safety inspection occurring at step 802. The steps of FIG. 11 can be performed individually or in any combination. In some embodiments, all steps of FIG. 11 will be performed. In other embodiments, only some steps will be performed. Additional optional steps will be obvious to those of ordinary skill in the art having the benefit of this disclosure.

In one embodiment, the site safety inspection of step 802 will include capturing a video 1101 of a safety cable. Turning briefly to FIG. 6, in one embodiment this occurs when the drone 101 starts at position 605, which is at the bottom of the safety cable 606. The drone 101 then ascends 609 to position 607 at the top 608 of the safety cable 606, capturing a continuous video during the ascent. Turning now back to FIG. 11, in addition to the video capture, in one embodiment the site safety inspection of step 802 will include capturing a still photograph 1104 of the bottom of the safety cable (606). In one embodiment, the site safety inspection of step 802 will include capturing a still photograph 1105 of the top (608) of the safety cable (606) as well.

In one embodiment, the site safety inspection of step 802 will include capturing supplemental photographs 1102, such as those described above with reference to FIG. 10. In one embodiment, the site safety inspection of step 802 includes a photograph 1103 of the gate of the ground compound. In one embodiment, this photograph 1103 of the gate of the compound occurs while the gate is closed and ensures that any signage on the gate is captured in the photograph 1103.

In one embodiment, the site safety inspection of step 802 will include capturing a still photograph 1106 of a safety beacon disposed at the top of the tower. While step (701) of FIG. 7 was described above as a portion of video, the still photograph 1106 could resemble the image of this step (701) since the safety beacon is shown therein. In other embodiments, the still photograph 1106 could be a magnified, sub-image of that shown in step (701) so that the safety beacon fills, for example, seventy percent of the image composition.

In one embodiment, the site safety inspection of step 802 will include capturing one or more photographs 1107 of any sidelights attached to the tower. In one embodiment, the site safety inspection of step 802 will include capturing one or more photographs 1108 of any guy wire attachments coupled to the tower. In one embodiments, the one or more photographs 1108 of the guy wires will comprise between three and eight pictures of the guy wires, with at least one picture taken from the north side of the tower, at least one from the east side of the tower, at least one picture taken from the south side of the tower, and at least one picture taken from the west side of the tower. In one embodiment, the site safety inspection of step 802 will include capturing one or more photographs 1109 of any guy shoes coupled to the tower. In one embodiment, the one or more photographs 1108 of the guy shoes will comprise between three and eight pictures of the guy shoes.

Figure 12:
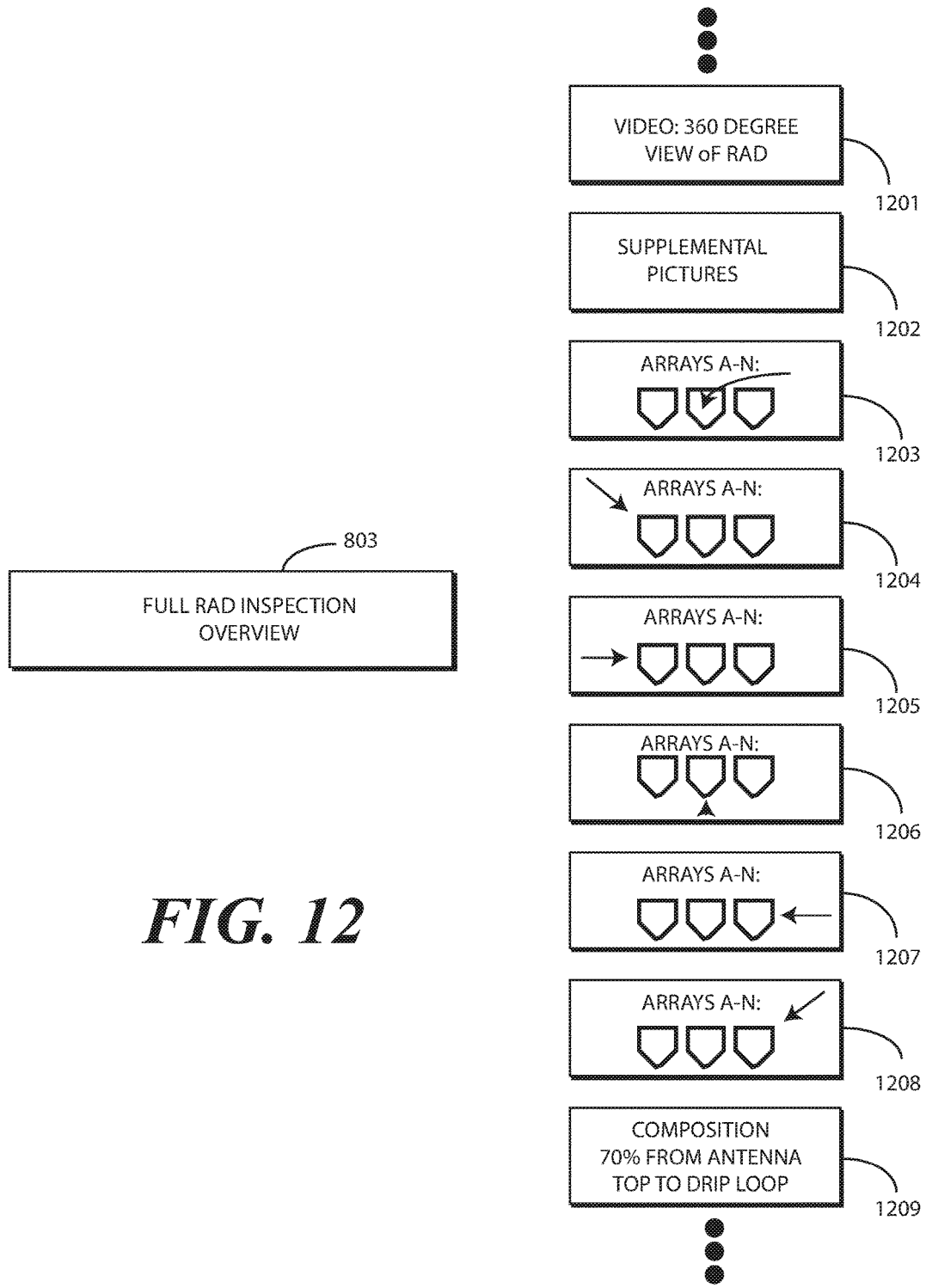
FIG. 12 illustrates one or more method steps in accordance with one or more embodiments of the disclosure.

Turning now back to FIG. 8, at step 803 the additional and optional steps can include the performance of a RAD inspection overview. Turning now to FIG. 12, illustrative steps for inclusion with the RAD inspection overview occurring at step 803. The steps of FIG. 12 can be performed individually or in any combination. In some embodiments, all steps of FIG. 12 will be performed. In other embodiments, only some steps will be performed. Additional optional steps will be obvious to those of ordinary skill in the art having the benefit of this disclosure.

In one embodiment, the RAD inspection overview of step 803 will include capturing a video 1201 showing a 360-degree rotation about each RAD. In one embodiment, the video 1201 has a duration of between 55 and 80 seconds. In one embodiment, the video 1201 includes metadata identifying the RAD being videoed. In one embodiment, the rotation shown in the video 1201 occurs counterclockwise from a center of the alpha array. In one embodiment, the composition of the video 1201 is filled at least seventy percent with the RAD being captured.

In one embodiment, the RAD inspection overview of step 803 will include capturing one or more supplemental pictures 1202 of the arrays. In one or more embodiments, these supplemental pictures 1202 comprise at least seven photographs. For example, a first photograph 1203 can comprise a top down photo of the array. A second photograph 1204 can comprise a backside photograph occurring from a first side of the array. A third photograph 1205 can comprise a side photograph occurring from the first side of the array.

A fourth photograph 1206 can comprise a full array picture taken from the front of the array. A fifth photograph 1207 can comprise a second side photograph occurring from a second side of the array. A sixth photograph 1208 can comprise a second backside photograph occurring from the second side of the array. A seventh photograph 1209 can comprise an underside of the array showing the drip loop of any cables connected to the RADs of the array. These photographs can be repeated for each array on the tower in one or more embodiments. In other embodiments, more than seven photographs will be captured. In still other embodiments, fewer than seven photographs will be captured.

Figure 13:
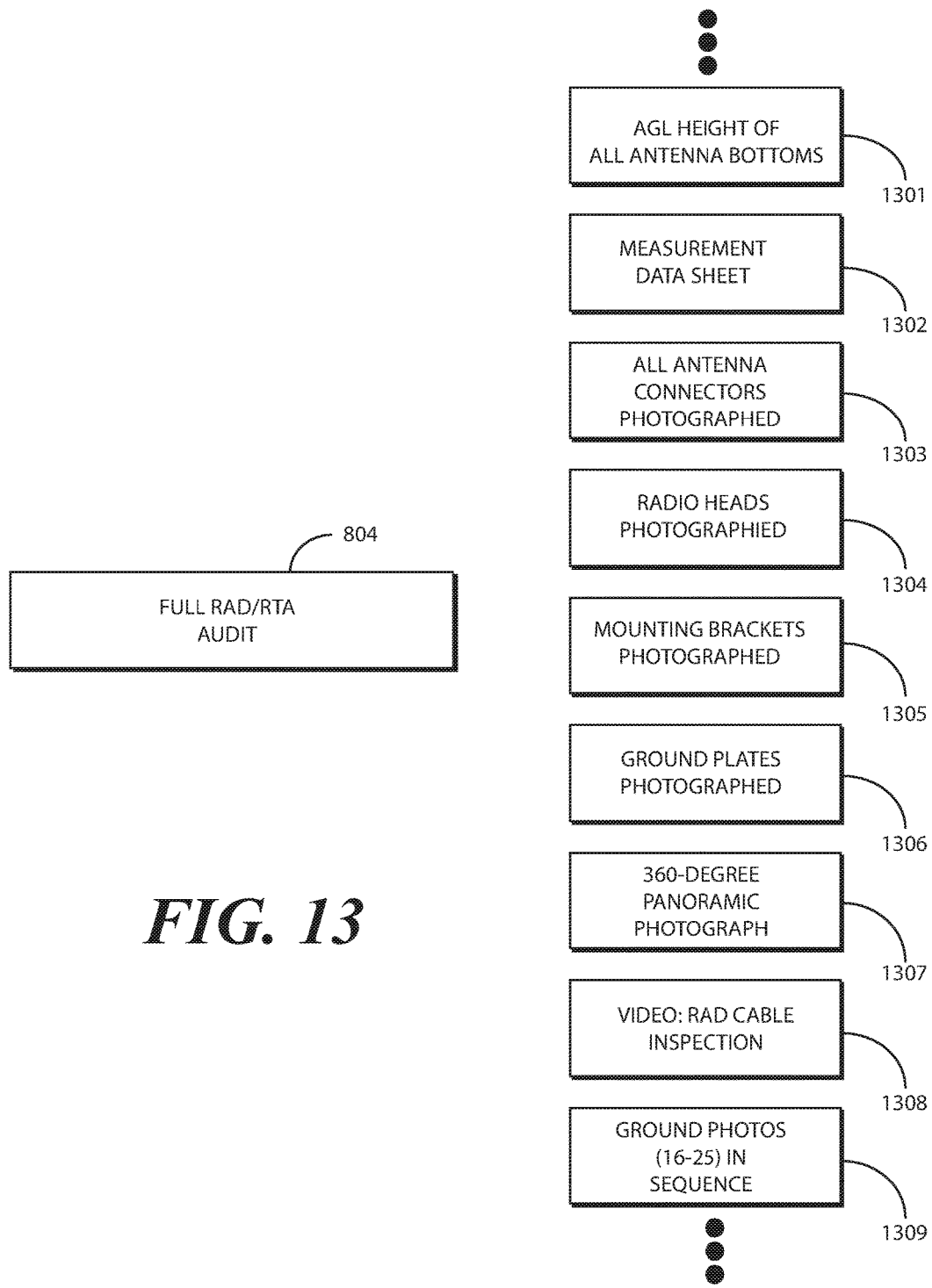
FIG. 13 illustrates one or more method steps in accordance with one or more embodiments of the disclosure.

Turning now back to FIG. 8, at step 804 the additional and optional steps occurring beyond the method (200) of FIG. 2 can include the performance of a RAD audit. Turning now to FIG. 13, illustrative steps for inclusion with the RAD audit occurring at step 804. In one embodiment, all of the photographs shown in FIG. 12 associated with the RAD inspection overview are included with the RAD audit occurring at step 804. In other embodiments, these photographs are omitted in the RAD audit. Accordingly, the steps of FIG. 13 can be performed individually or in any combination. In some embodiments, all steps of FIG. 13 will be performed. In other embodiments, only some steps will be performed. Additional optional steps will be obvious to those of ordinary skill in the art having the benefit of this disclosure.

In one embodiment, the RAD audit of step 804 includes taking a measurement 1301 of the heights of all RAD bottoms. In one embodiment, the RAD audit of step 804 includes capturing a photograph 1302 of a measurement data sheet indicating these measurements. In one embodiment, the RAD audit of step 804 includes taking one or more photographs 1303 of all antenna connectors, with those photographs 1303 being taken from both the front and back of each connector. In one embodiment, the RAD audit of step 804 includes taking a sufficient number of supplemental photographs 1304 so as to capture all radio heads on the tower.

In one embodiment, the RAD audit of step 804 includes taking a sufficient number of supplemental photographs 1305 so as to capture all mounting brackets. In one embodiment, the RAD audit of step 804 includes taking a sufficient number of supplemental photographs 1306 so as to capture all ground plates of the tower. In one embodiment, the RAD audit of step 804 includes taking a sufficient number of supplemental photographs 1307 so as to capture all serial numbers of all equipment associated with the tower. In one embodiment, the RAD audit of step 804 includes taking a sufficient number of supplemental photographs 1308 of any cables coupled to any RADs. In one embodiment, the RAD audit of step 804 includes taking a sufficient number of supplemental photographs 1309 so as to capture all so as to capture all portions of the ground compound disposed between the carrier cabinets and the tower.

Turning now back to FIG. 8, the additional and optional steps occurring beyond the method (200) of FIG. 2 can include the creation of a three-dimensional model at step 805. In one or more embodiments, step 805 can include the capture of successive images of an environment. From these successive images, a three-dimensional model of any of a tower, RADs, RTAs, a compound disposed around the tower, equipment disposed within the compound, and the like, may be constructed. Three-dimensional models of these assets can then be delivered to clients for analysis. Supplemental images files can accompany the three-dimensional models. For example, in one embodiment each three-dimensional model includes six supplemental files: .JPG files showing images used to create the three-dimensional models; a .FBX cad file; a .DXF cad file; a .LAZ cad file; a .LAS cad file; and a .OBJ cad file. Other supplemental files will be obvious to those of ordinary skill in the art having the benefit of this disclosure.

At step 804 the additional and optional steps occurring beyond the method (200) of FIG. 2 can include taking measurements of the plumb, azimuth, and tilt of each RAD. Additionally, measurements of tower trusses, RTAs, and other devices can be obtained as well. Turning now to FIG. 14, illustrated therein are some of the steps that can be used to take such measurements at step 806.

Beginning with step 1401, the orientation of the drone in three-dimensional space can be determined from the onboard sensors. For example, if the drone includes a gravity sensor, the one or more processors of the drone can determine its tilt, plumb, and azimuth relative to the vector defined by the direction of gravity. Similarly, accelerometers, electric compasses, and/or gyroscopes can be used to determine the pitch, bearing, and tilt of the drone to determine whether the image capture device is oriented vertically or at another angle. At step 1402, the geographic location of the drone can be determined from a geolocation detector device. This information, e.g., pitch, bearing, tilt, plumb, geographic location, etc., can then be saved to memory and written to metadata of subsequent images that may be captured.

At step 1403, the drone is aligned with the asset to be measured. For instance, if measuring the plumb of a RAD, the drone would be aligned so as to be able to capture a front elevation view of the RAD. If measuring tilt, the drone would be aligned so as to be able to capture a side elevation view of the RAD. If measuring azimuth, the drone would be aligned to capture either a top plan view of the RAD or a bottom plan view of the RAD. Typically the former would be used due to the fact that cables are frequently coupled to the bottom of the RAD.

At step 1404, the appropriate image is captured of the RAD. For plumb, this image is a front elevation view. For tilt, this is a side elevation view. For azimuth, this is generally a top plan view. As noted above, drone information indicating pitch, bearing, tilt, plumb, geographic location, etc. can then written to the metadata of the captured image.

At step 1405, a reference line is defined along the image. For plumb and tilt, this reference line will be vertical, and will be aligned with the vector defined by the direction of gravity. If the pitch, bearing, tilt, and plumb of the image capture device of the drone was not along this reference, the pitch, bearing, tilt, and plumb measurements of the drone found in the metadata can be used to calibrate the reference line along the vector defined by the direction of gravity. If measuring azimuth, this reference line will generally be a horizontal reference that is aligned perpendicular with the bearing as defined by the electronic compass or other bearing detector.

At step 1406, an edge of the asset to be measured is used to superimpose a measurement line indicating the physical orientation of the measurement line in three-dimensional space. For plumb and tilt, this measurement line will generally be superimposed along a side edge of the RAD. For azimuth, this measurement line will generally be along a front face of the RAD. For RTAs, lines defined along major and minor faces can be used.

At step 1407, a measurement angle can be determined by comparing the reference line and the measurement line. In one or more embodiments, this involves counting pixels of the image and using the Pythagorean theorem or other trigonometric relationships to define the angle. If, for example, plumb is being measured and the reference line is parallel to the vector defined by the direction of gravity, and the measurement line defines an acute vertex at the bottom of the RAD and an orthogonal leg between the reference line and the measurement line at the top, the angle of the acute vertex will be the plumb relative to normal. Other techniques for measuring the angle between a reference line and a superimposed measurement line will be obvious to those of ordinary skill in the art having the benefit of this disclosure. At step 1408, this process can be repeated for any remaining measurements.

Figure 14:
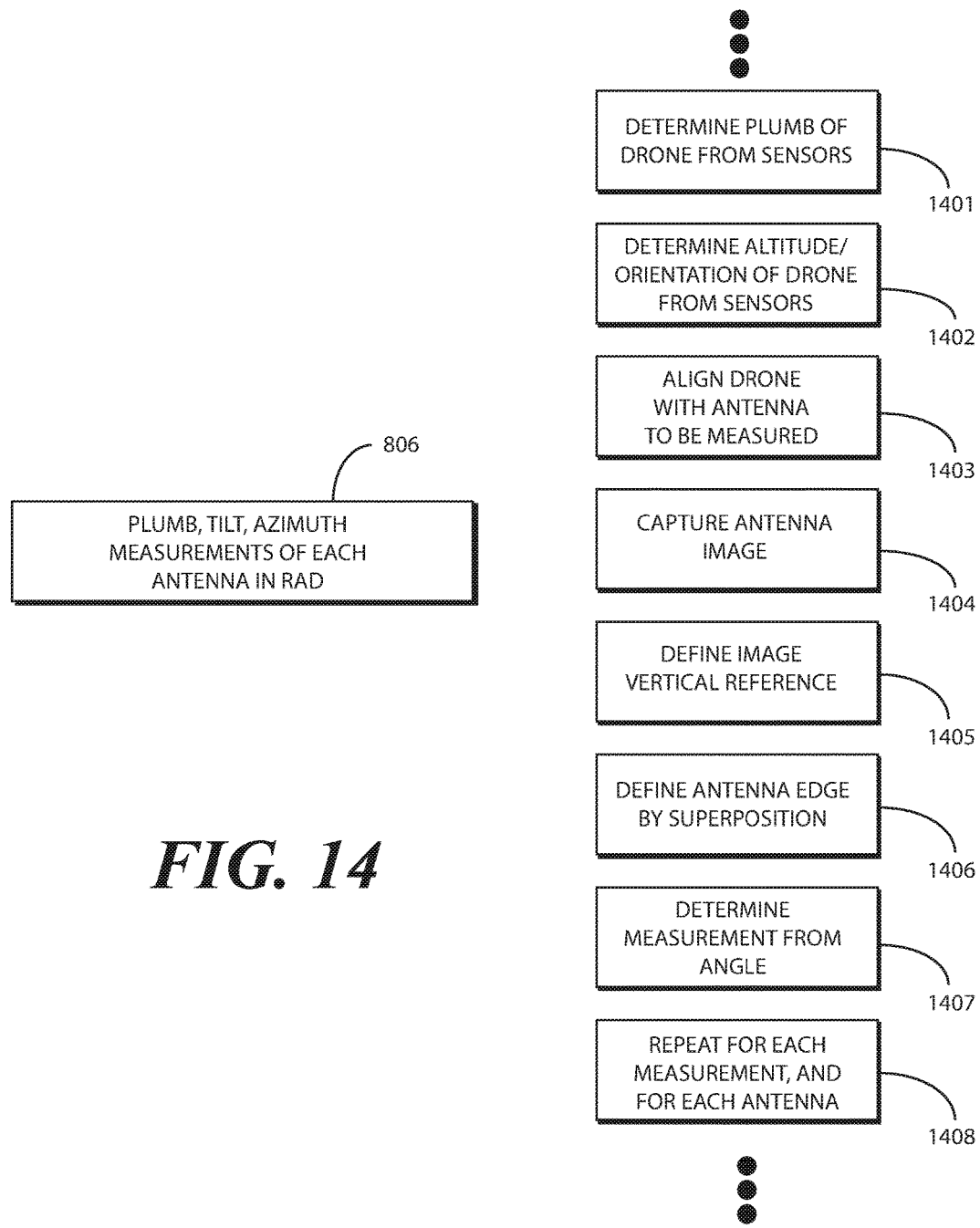
FIG. 14 illustrates one or more method steps in accordance with one or more embodiments of the disclosure.
Figure 15:
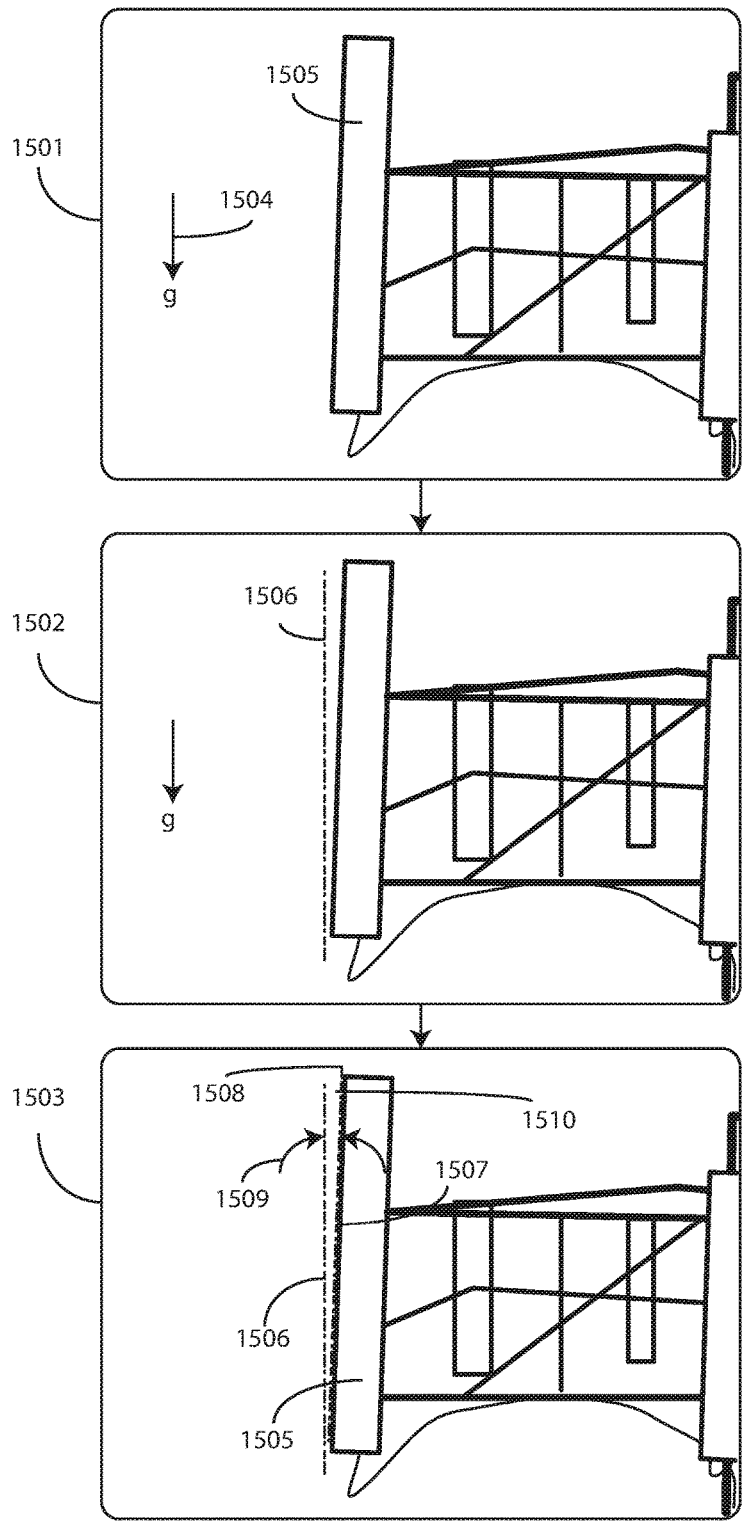
FIG. 15 illustrates one or more method steps in accordance with one or more embodiments of the disclosure.

Turning to FIG. 15, the steps of FIG. 14 are illustrated graphically. Beginning at step 1501, the orientation of the drone in three-dimensional space has been determined from the onboard sensors as previously described. The one or more processors of the drone have determined its tilt, plumb, and azimuth relative to the vector 1504 defined by the direction of gravity. Accelerometers, electric compasses, and/or gyroscopes have determined the pitch, bearing, and tilt of the drone to determine whether the image capture device is oriented vertically or at another angle. The geographic location of the drone has also been determined from the geolocation detector device. This information is saved to memory and written to metadata of subsequent images that may be captured.

The drone is also aligned with a RAD 1505 to be measured. In this illustration, the drone is measuring plumb. Accordingly, the drone is aligned so that the image capture device has a front elevation view of the RAD as shown at step 1501. Accordingly, the front elevation view image is captured by the image capture device. In one or more embodiments, a single image is captured for azimuth and tilt measurements, while two images are captured for plumb measurements.

As shown at step 1502, a reference line 1506 is defined along the front elevation view image. Since plumb is being measured, the reference line 1506 is vertical, and is aligned with the vector 1504 defined by the direction of gravity.

At step 1503, an edge 1507 of the RAD 1505 is used to superimpose a measurement line 1508 indicating the physical orientation of the measurement line 1508 in three-dimensional space. The measurement angle 1509 can be determined by comparing the reference line 1506 and the measurement line 1508. In this illustrative embodiment, pixels 1510 between the measurement line 1508 and the reference line 1506 are counted. Trigonometric relationships can then be used to compare the length of the edge 1507 of the RAD 1505, the angle between the reference line 1506 and the measurement line 1508, and the distance between the reference line 1506 and the measurement line 1508 at the top of the RAD 1505 to determine the plumb angle. Multiple images can be cross-referenced to confirm accuracy. Experimental testing indicates that this method yields azimuth measurements with an accuracy of plus or minus three degrees, and plumb and tilt measurements with an accuracy of plus or minus one degree.

Figure 16:
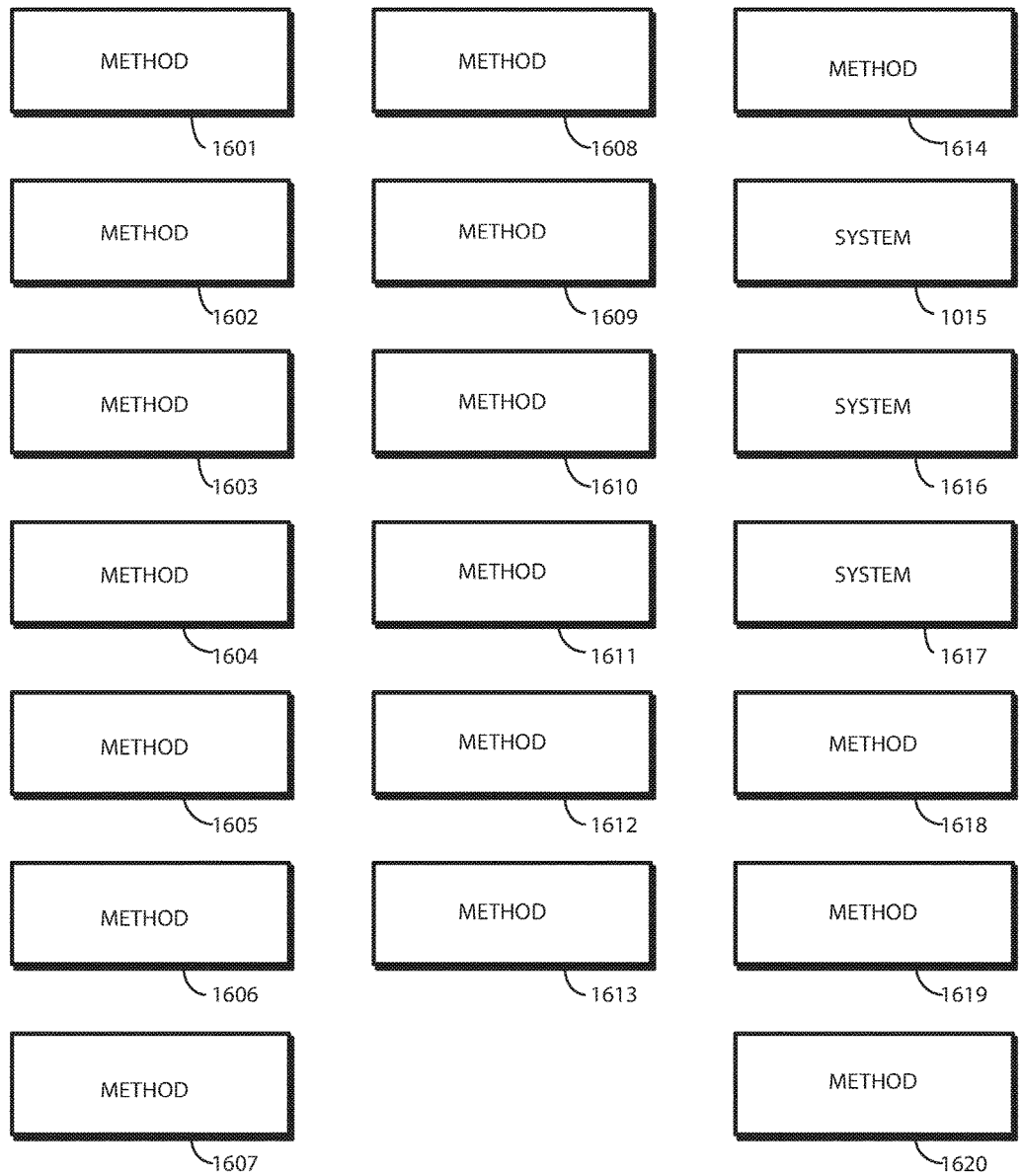
FIG. 16 illustrates one or more embodiments of the disclosure.

Turning now to FIG. 16, illustrated therein are various embodiments of the disclosure. At 1601, a method of inspecting a wireless communication tower comprises deploying an unmanned aircraft outside a gate of a ground compound of the wireless communication tower. At 1601, the method includes capturing, with an image capture device of the unmanned aircraft, one or more of video or still images of information identifying the wireless communication tower disposed on an identification sign on the gate. At 1601, the method includes, after the capturing the one or more video or still images of the information identifying the wireless communication tower, also capturing, with the image capture device, additional one or more video or still images of one or more Radio Antenna Devices (RADs) coupled to the tower.

At 1602, the one or more of video or still images of the information identifying the wireless communication tower at 1601 comprise video images of the information identifying the wireless communication tower. At 1602, the additional one or more video or still images of the one or more RADs of 1601 comprise additional video images of the one or more RADs. At 1602, any transition between the video images of the information identifying the wireless communication tower and the additional video images of the one or more RADs of 1601 occurs as a continuous video without cuts.

At 1603, the method of 1602 further comprises capturing other video images of the ground compound between capturing the video images of the information identifying the wireless communication tower and the also capturing the additional video images of the one or more RADs. At 1604, the capturing the other video images of the ground compound occurring at 1603 comprises capturing a perspective view of the ground compound in full frame. At 1605, the perspective view of 1604 occupies at least a seventy-percent composition of the full frame.

At 1606, the method of 1602 comprises causing the unmanned aircraft to execute a counterclockwise, 360-degree rotation about the one or more RADs. At 1607, the method of 1606 comprises capturing other video images of all RADs coupled to the tower during the counterclockwise, 360-degree rotation. At 1608, the counterclockwise, 360-degree rotation of 1607 occurs for a duration of between 90 and 140 seconds. At 1609, the method of 1607 further includes causing the unmanned aircraft to execute N additional counterclockwise, 360-degree rotations about the wireless communication tower, where N equals the number of arrays coupled to the wireless communication tower. At 1610, the method of 1609 further comprises capturing still other images of the RADs coupled to a Nth array while making a Nth counterclockwise, 360-degree rotation about the wireless communication tower.

At 1611, the method of 1601 further comprises capturing one or more supplemental still photographs of the wireless communication tower. At 1612, the method of 1601 further comprises performing a site safety overview. At 1613, the method of 1601 further comprises performing a RAD inspection overview. At 1614, the method of 1601 further comprises performing a RAD audit.

At 1615, a tower inspection system comprises an unmanned aircraft. At 1615, the unmanned aircraft comprises one or more processors operable with an image capture device and a propulsion system. At 1615, the propulsion system navigates the unmanned aircraft about a wireless communication tower. At 1615, the image capture device captures one or more video images of information identifying the wireless communication tower disposed on an identification sign prior to capturing other video images of one or more Radio Antenna Devices (RADs) coupled to the tower.

At 1616, the image capture device of 1615 captures additional video images of a ground compound disposed about the wireless communication tower between capturing the video images of the information identifying the wireless communication tower and the other video images of the one or more RADs. At 1617, the one or more processors of 1615 further measure one or more of plumb, azimuth, or tilt of any of the one or more RADs.

At 1618, a method of measuring a physical orientation of a wireless communication tower asset comprises aligning an unmanned aircraft with a Radio Antenna Device (RAD). At 1618, an image capture devices captures an image of the RAD. At 1618, one or more processors define a reference line along the image. At 1618, the one or more processors superimpose a measurement line along the image, the measurement line indicating a physical orientation of the RAD in three-dimensional space. At 1618, the method compares the reference line and the measurement line to determine one or more of a plumb measurement, a tilt measurement, or an azimuth measurement of the RAD.

At 1619, the one or more of the plumb measurement, the tilt measurement, or the azimuth measurement of the RAD occurring at 1618 comprises the plumb measurement of the RAD and the image comprises a front elevation view of the RAD. At 1620, the comparing of 1618 comprises counting pixels in the image disposed between the measurement line and the reference line.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of measuring a physical orientation of a wireless communication tower asset, the method comprising:
    aligning an unmanned aircraft with a Radio Antenna Device (RAD);
    capturing, with an image capture device of the unmanned aircraft, an image of the RAD;
    determining an orientation of the unmanned aircraft in three-dimensional space and writing the orientation to metadata of the image;
    defining, with one or more processors, a reference line along the image, wherein the reference line is a function of the orientation written to the metadata of the image;
    superimposing, with the one or more processors, a measurement line along the image, the measurement line indicating the physical orientation of the RAD in three-dimensional space; and
    comparing the reference line and the measurement line to determine one or more of a plumb measurement, a tilt measurement, or an azimuth measurement of the RAD.

2. The method of claim 1, wherein the one or more of the plumb measurement, the tilt measurement, or the azimuth measurement of the RAD comprises the plumb measurement of the RAD, wherein the image comprises a front elevation view of the RAD.

3. The method of claim 1, wherein the comparing comprises counting pixels in the image disposed between the measurement line and the reference line.

4. The method of claim 1, wherein the determining the orientation of the unmanned aircraft in three-dimensional space further comprises determining, with a gravity sensor, a direction of gravity.

5. The method of claim 4, wherein the determining the orientation of the unmanned aircraft in three-dimensional space further comprises comparing the orientation of the unmanned aircraft in three-dimensional space to a vector defined by the direction of gravity.

6. The method of claim 4, wherein the defining the reference line along the image comprises aligning the reference line with a vector defined by the direction of gravity.

7. The method of claim 4, further comprising calibrating the reference line along a vector defined by the direction of gravity.

8. The method of claim 1, further comprising determining, with a geolocation detector device, a geographic location of the unmanned aircraft.

9. The method of claim 8, further comprising writing, with the one or more processors, the geographic location of the unmanned aircraft to the metadata of the image.

10. The method of claim 1, wherein the one or more of the plumb measurement, the tilt measurement, or the azimuth measurement of the RAD comprises the tilt measurement of the RAD, wherein the image comprises a side elevation view of the RAD.

11. The method of claim 1, wherein the one or more of the plumb measurement, the tilt measurement, or the azimuth measurement of the RAD comprises the azimuth measurement of the RAD, wherein the image comprises a top plan view of the RAD.

12. The method of claim 1, wherein the one or more of the plumb measurement, the tilt measurement, or the azimuth measurement of the RAD comprises the azimuth measurement of the RAD, wherein the image comprises a bottom plan view of the RAD.

13. The method of claim 1, further comprising writing, with the one or more processors, the one or more of the plumb measurement, the tilt measurement, or the azimuth measurement of the RAD to the metadata of the image.

14. The method of claim 1, wherein the superimposing the measurement line along the image comprises superimposing the measurement line along an edge of the RAD.

15. The method of claim 14, the edge comprising a side edge of the RAD.

16. The method of claim 1, the comparing the reference line and the measurement line comprising determining a measurement angle between the reference line and the measurement line.

17. The method of claim 16, wherein the reference line and the measurement line define an acute vertex at a bottom of the RAD.

* * * * *